(12) United States Patent
Tobisch

(10) Patent No.: US 12,313,857 B2
(45) Date of Patent: May 27, 2025

(54) OPTICAL SYSTEM FOR IMAGING AN OBJECT, AND METHOD FOR OPERATING THE OPTICAL SYSTEM

(71) Applicant: Carl Zeiss AG, Oberkochen (DE)

(72) Inventor: Alexander Tobisch, Ellwangen (DE)

(73) Assignee: Carl Zeiss AG, Oberkochen (DE)

( * ) Notice: Subject to any disclaimer, the term of this patent is extended or adjusted under 35 U.S.C. 154(b) by 262 days.

(21) Appl. No.: 17/372,480

(22) Filed: Jul. 11, 2021

(65) Prior Publication Data

US 2022/0107489 A1 Apr. 7, 2022

Related U.S. Application Data

(63) Continuation of application No. PCT/EP2020/050421, filed on Jan. 9, 2020.

(30) Foreign Application Priority Data

Jan. 11, 2019 (DE) .................... 10 2019 200 309.5

(51) Int. Cl.
*G02B 7/06* (2021.01)
*G02B 7/18* (2021.01)
(Continued)

(52) U.S. Cl.
CPC ............. *G02B 27/646* (2013.01); *G02B 7/06* (2013.01); *G02B 7/1805* (2013.01);
(Continued)

(58) Field of Classification Search
CPC ........................................... G02B 27/64–648
See application file for complete search history.

(56) References Cited

U.S. PATENT DOCUMENTS

| | | |
|---|---|---|
| 3,437,397 A | 4/1969 | Humphrey |
| 3,582,180 A | 6/1971 | Gross |

(Continued)

FOREIGN PATENT DOCUMENTS

| | | |
|---|---|---|
| AT | 2861 U1 | 5/1999 |
| CN | 103278920 A | 9/2013 |

(Continued)

OTHER PUBLICATIONS

Office Action issued in Chinese Counterpart Application No. 202080008867.5, dated Aug. 31, 2022.
(Continued)

*Primary Examiner* — Christopher Stanford
(74) *Attorney, Agent, or Firm* — Ewers IP Law PLLC; Falk Ewers

(57) ABSTRACT

An optical system for imaging an object includes a first objective, a first image stabilizing unit, and a first image plane, wherein, as seen from the first objective in the direction of the first image plane, the first objective is arranged first along a first optical axis, followed by the first image stabilizing unit and then the first image plane, wherein the first image stabilizing unit comprises a first optical unit and a second optical unit, wherein the first optical unit is arranged between the first objective and the second optical unit, wherein the first optical unit is embodied so as to be rotatable about a first axis of rotation, and wherein the second optical unit is embodied so as to be rotatable about a second axis of rotation. The second optical unit is embodied as an optical roof edge unit.

32 Claims, 7 Drawing Sheets

(51) Int. Cl.
*G02B 7/182* (2021.01)
*G02B 17/04* (2006.01)
*G02B 17/08* (2006.01)
*G02B 23/06* (2006.01)
*G02B 23/18* (2006.01)
*G02B 27/64* (2006.01)

(52) U.S. Cl.
CPC ........... *G02B 7/1821* (2013.01); *G02B 17/04* (2013.01); *G02B 17/08* (2013.01); *G02B 23/06* (2013.01); *G02B 23/18* (2013.01)

(56) References Cited

U.S. PATENT DOCUMENTS

| | | | |
|---|---|---|---|
| 3,944,324 A | | 3/1976 | Tajima et al. |
| 4,235,506 A | | 11/1980 | Saito et al. |
| 4,465,346 A | | 8/1984 | Fraser |
| 5,072,313 A | * | 12/1991 | Schweitzer ............ G02B 17/04 |
| | | | 359/836 |
| 5,910,859 A | | 6/1999 | Takahashi et al. |
| 6,067,195 A | | 5/2000 | Hirunuma et al. |
| 6,327,079 B1 | * | 12/2001 | Namii .................... G02B 21/22 |
| | | | 359/380 |
| 2003/0043460 A1 | | 3/2003 | Iizuka et al. |
| 2012/0299690 A1 | | 11/2012 | Nakanishi et al. |
| 2012/0299691 A1 | | 11/2012 | Takase et al. |
| 2013/0194666 A1 | * | 8/2013 | Teroerde ............. G02B 27/646 |
| | | | 359/554 |
| 2016/0131922 A1 | | 5/2016 | Nagahara et al. |
| 2017/0075131 A1 | | 3/2017 | Kaya |
| 2018/0364495 A1 | | 12/2018 | Awazu et al. |

FOREIGN PATENT DOCUMENTS

| | | |
|---|---|---|
| CN | 108508589 A | 9/2018 |
| DE | 130508 C | 5/1902 |
| DE | 2353101 C3 | 1/1979 |
| DE | 3933255 A1 | 5/1991 |
| DE | 3933255 C2 | 12/1995 |
| DE | 102011117702 A1 | 5/2013 |
| DE | 102011117702 B4 | 6/2013 |
| DE | 102013200321 A1 | 7/2014 |
| DE | 202018106070 U1 | 12/2018 |
| EP | 0636916 B1 | 11/2000 |
| JP | 11295774 A | 10/1999 |
| JP | 2014232278 A | 12/2014 |
| JP | 2016095490 A | 5/2016 |
| WO | 2014108428 A2 | 7/2014 |

OTHER PUBLICATIONS

Search Report issued in Chinese Counterpart Application No. 202080008867.5, dated Aug. 25, 2022.

Office Action issued in German Patent Application No. DE 10 2019 200 309.5, dated Aug. 14, 2019 (from which this application claims priority) and English language translation thereof.

International Preliminary Report on Patentability of the European Patent Office in PCT/EP2020/050421 (from which this application claims priority) mailed Jul. 22, 2021 and English-language translation thereof.

Office Action issued in Chinese Patent Application No. 202080008867.5, dated Apr. 12, 2023, and English Language Translation thereof.

Office Action issued in Japanese Counterpart Patent Application No. JP 2021-539443, dated Jul. 26, 2022 and English language translation thereof.

Cepheiden, "Amici Prism", Website, https://de.wikipedia.org/w/index.php?title=Amici-Prisma&oldid=142662061, accessed on Dec. 16, 2019, pp. 1-2, Wikipedia.

Cepheiden, "Bauernfeind prism", Website, https://de.wikipedia.org/w/index.php?title=Bauernfeind-Prisma&oldid=130496697, accessed on Dec. 16, 2019, pp. 1-2, Wikipedia.

* cited by examiner

OPTICAL SYSTEM FOR IMAGING AN OBJECT, AND METHOD FOR OPERATING THE OPTICAL SYSTEM

CROSS REFERENCE TO RELATED APPLICATIONS

This application is a continuation application of international patent application PCT/EP2020/050421, filed Jan. 9, 2020, designating the United States and claiming priority to German application 10 2019 200 309.5, filed Jan. 11, 2019, and the entire content of both applications is incorporated herein by reference.

TECHNICAL FIELD

The disclosure relates to an optical system for imaging an object, wherein the optical system comprises an objective, an image stabilizing unit and an image plane. In one embodiment of the disclosure, the optical system is provided with an eyepiece, for example. Further, the disclosure relates to a method for operating the optical system.

BACKGROUND

The optical system referred to above is used in a telescope or in binoculars, for example. The image captured by an observer through the telescope or the binoculars is often perceived to be blurry since trembling movements or rotary movements of the hands of the user, or else movements of the ground, cause movements in the optical system in turn. Typical frequencies of a trembling movement of the hand range from 0 Hz to 20 Hz. Typical amplitudes of a rotary movement range from 0° to 8°. A known solution to the problem of blurring is that of stabilizing images in an optical system. Known solutions use image stabilizing devices for stabilizing the image with a mechanical device and/or an electronic device.

DE 23 53 101 C3 has disclosed an optical system in the form of a telescope, which comprises an objective, an image stabilizing unit in the form of a prism erecting system, and an eyepiece. The prism erecting system is gimballed in a housing of the telescope. This is understood to mean that the prism erecting system is arranged in the housing of the telescope in such a way that the prism erecting system is rotatably mounted about two axes that are arranged at right angles to one another. An apparatus known as a gimbal is usually used for rotatable bearing. A fulcrum of the prism erecting system gimballed in the housing is arranged at the midpoint between an image-side principal plane of the objective and an object-side principal plane of the eyepiece. On account of its inertia, the gimballed prism erecting system is not moved by arising rotary trembling movements. Consequently, it remains stationary in space. This compensates image blurring that arises on account of the rotary trembling movement of the housing. However, there might not be a stabilization of trembling movements at all relevant frequencies and/or amplitudes in the case of this purely mechanical image stabilization. Expressed differently, there might well be no stabilization for certain specific trembling movements or rotational movements.

DE 39 33 255 C2 has disclosed binocular field glasses with image stabilization, which comprise a prism erecting system. The prism erecting system comprises Porro prisms, which each have a tilt axis. The Porro prisms are embodied to be pivotable about their respective tilt axis. Motors are provided to pivot the Porro prisms. The pivoting is implemented on the basis of a trembling movement which causes blurring of an image.

DE 20 2018 106 070 U1 has disclosed an apparatus for horizontal and vertical image stabilization in the case of a telescope. The apparatus comprises an image erecting system arranged between an objective and an eyepiece. The image erecting system consists of a plane mirror that has been placed into the imaging beam path at an angle, and a roof prism. The plane mirror is mounted so as to be rotatable about both a longitudinal axis and a transverse axis, with a point of intersection of the longitudinal axis and the transverse axis coinciding with the point of incidence of the optical axis of the objective on the plane mirror.

A further optical system with an image stabilizing unit is known from U.S. Pat. No. 5,910,859. The image stabilizing unit of this optical system is embodied in the form of an erecting system which is arranged at an optically neutral point midway between an objective and an eyepiece. An optically neutral point is understood to be a point about which the objective and the eyepiece can be rotated relatively in space without the position of an image of an object being displaced, wherein the erecting system remains fixed in space. The erecting system is arranged to be movable about the optically neutral point and about two axes which are arranged perpendicular to the optical axis. If the erecting system is now kept stable in space even in the case of a trembling movement, then the image of an object is also stabilized when the object is observed with this known optical system. The optically neutral point can also be described as follows: An optically neutral point is understood to mean a point on an optical axis between an objective and an eyepiece about which an image stabilizing unit is arranged in rotatable fashion such that, in the case of a rotary trembling movement about any point, the direction of the image of an object observed through the objective and the eyepiece remains fixed in space, just like the image stabilizing unit.

Deliberations have yielded that the position of the erecting system proposed in U.S. Pat. No. 5,910,859 requires a relatively large erecting system so as to not vignette the beam. Therefore, a housing in which the erecting system is arranged is likewise quite big. It has the shape of a box. Many users describe the aesthetic impression of this device in the form of a brick as not very nice. Further, a consequence of a relatively large erecting system is that the moment of inertia of the erecting system is quite high. Therefore, relatively large forces are required to move the erecting system. To provide these relatively large forces, high-power motors, which in turn require much installation space, are usually used. Further, such motors have a high energy consumption, and so this leads to shortened runtimes of the batteries which are usually used to supply power to the motors.

Further, the common use of a single image stabilizing unit for both a first optical subsystem in a first tube and for a second optical subsystem in a second tube is known in the case of binoculars known from the prior art. For structural reasons, this single image stabilizing unit is at least as wide as the distance between the first tube and the second tube. Further, this single image stabilizing unit is heavy. If a motor is now used to adjust the single image stabilizing unit, it needs to be powerful in turn which in turn leads to the problems already mentioned above.

SUMMARY

It is an object of the disclosure to provide an optical system for imaging an object, comprising an image stabilizing unit with relatively low inertia such that, in comparison with the prior art, it is possible to use lower forces for adjusting the image stabilizing unit and a smaller housing for the optical system. A method for operating the optical system is also provided.

According to the disclosure, this object is achieved with an optical system and a method as described herein.

The optical system according to the disclosure for imaging an object comprises at least one objective, for example a first objective, at least one image stabilizing unit, for example a first image stabilizing unit, and at least one image plane, for example a first image plane. As seen from the objective in the direction of the image plane, the objective is arranged first along an optical axis of the optical system, for example a first optical axis, followed by the image stabilizing unit and then the image plane. Expressed differently, the image stabilizing unit is arranged between the objective and the image plane. In one embodiment, provision is made for the objective to be embodied for focusing purposes and for at least one unit of the objective to be displaced, for example along the optical axis, for focusing purposes. In a further embodiment, provision is made for the objective to comprise at least one front unit, for example a first front unit, and at least one focusing unit, for example a first focusing unit, wherein the focusing unit is displaced along the optical axis for focusing purposes. In yet another alternative, provision is made for the focusing to be implemented by an eyepiece, for example a first eyepiece, which is provided, e.g., on the optical system and which will be discussed in more detail below.

By way of example, the optical system according to the disclosure is embodied as a monocular, a spyglass, a pair of binoculars, a telescope and/or a spotting scope.

The image stabilizing unit comprises at least one first optical unit and at least one second optical unit. By way of example, the first optical unit of the image stabilizing unit is arranged between the objective and the second optical unit of the image stabilizing unit. Further, the first optical unit of the image stabilizing unit is embodied so as to be rotatable about a first axis of rotation. Provision is made for the first axis of rotation to be the only axis of rotation about which the first optical unit of the image stabilizing unit rotates. Accordingly, provision is made in this embodiment for the first optical unit not to rotate about any further axis of rotation. The second optical unit of the image stabilizing unit is embodied so as to be rotatable about a second axis of rotation. In particular, provision is made for the second axis of rotation to be the only axis about which the second optical unit of the image stabilizing unit rotates. Accordingly, provision is made in this embodiment for the second optical unit not to rotate about any further axis of rotation other than the second axis of rotation. By way of example, provision is made in one embodiment of the disclosure for the first axis of rotation and the second axis of rotation to be different axes. Expressed differently, the first axis of rotation and the second axis of rotation are not parallel. Since the first axis of rotation and the second axis of rotation are different axes in this embodiment, the rotation of the first optical unit of the image stabilizing unit about the first axis of rotation and the rotation of the second optical unit of the image stabilizing unit about the second axis of rotation can be implemented independently of one another in this embodiment. Expressed differently, a rotation of the first optical unit of the image stabilizing unit about the first axis of rotation does not necessarily cause a rotation of the second optical unit of the image stabilizing unit about the second axis of rotation. Rather, a rotation of the first optical unit of the image stabilizing unit about the first axis of rotation may optionally cause a rotation of the second optical unit of the image stabilizing unit about the second axis of rotation.

Further, provision is made in the optical system according to the disclosure for the second optical unit of the image stabilizing unit to be an optical roof edge unit, for example a first optical roof edge unit. By way of example, the second optical unit of the image stabilizing unit is embodied as a first mirror system and/or as a first roof prism. Expressed differently, the second optical unit of the image stabilizing unit can be embodied as a direct-vision optical unit without a beam offset or with only a small beam offset. In respect of the embodiment as first roof prism reference is also made to the explanations given below.

The disclosure is advantageous in that the first optical unit and the second optical unit have a low weight such that the moment of inertia of the first optical unit and/or the second optical unit is reduced in comparison with the prior art. Therefore, motors with a relatively low power in comparison with the prior art, for example, can be used in the optical system according to the disclosure for adjusting the first optical unit and/or the second optical unit. Such motors are distinguished in that these, in comparison with the prior art, need to provide less power and have a lower power consumption. At the same time, it is possible to use smaller image stabilizing units than in the prior art without this leading to a deterioration in the imaging properties of the optical system according to the disclosure. Consequently, it is also possible to use a smaller housing for the optical system according to the disclosure than in the prior art, and so many users would describe the aesthetic impression as pleasing. Further, the disclosure allows the drive units used to move the first optical unit and used to move the second optical unit to be able to be arranged in a region in the housing below the first optical unit or below the second optical unit, and so the drive units are able to be integrated into available installation space.

As already described above, the image stabilizing unit comprises the first optical unit and the second optical unit. Stabilization of an image in a first direction is obtained by rotating the first optical unit about the first axis of rotation. The stabilization of the image in a second direction, which for example is aligned perpendicular to the first direction, is implemented by rotating the second optical unit about the second axis of rotation. This is discussed in more detail further below.

In one embodiment of the optical system according to the disclosure, provision is additionally or alternatively made for the second axis of rotation, about which the second optical unit of the image stabilizing unit is rotated, to be aligned at an angle of 10° to 89° with respect to the optical axis, with the range boundaries being included in the aforementioned range. In particular, provision is made for the second axis of rotation to be aligned at an angle of 20° to 80° or at an angle of 30° to 70° or at an angle of 40° to 60° with respect to the optical axis, with the range boundaries being included in the aforementioned ranges. In a further embodiment, provision is made, e.g., for the second axis of rotation to be aligned at an angle of 62.5° with respect to the optical axis. It was found that the aforementioned alignments of the second axis of rotation with respect to the optical axis cause no image field rotation or only a small bothersome image field rotation. Consequently, the aforementioned alignments are particularly well suited to image stabilization.

In one embodiment of the optical system according to the disclosure, provision is additionally or alternatively made for the optical system according to the disclosure to have one of the following features:

the first optical unit of the image stabilizing unit is arranged between the objective and the second optical unit of the image stabilizing unit;

the second optical unit of the image stabilizing unit is arranged between the objective and the first optical unit of the image stabilizing unit.

In one embodiment of the optical system according to the disclosure, provision is additionally or alternatively made for the first optical unit of the image stabilizing unit to comprise at least one mirror, for example a first mirror, at least one plane mirror, for example a first plane mirror, and/or at least one prism, for example a first prism. In a further embodiment of the optical system according to the disclosure, provision is additionally or alternatively made for the first optical unit of the image stabilizing unit to have an individual surface at which light rays incident on the surface are reflected. By way of example, provision is made for the first optical unit of the image stabilizing unit to have a single surface at which light rays incident on the surface are reflected. Expressed differently, this further embodiment provides for no further surface at which incident light beams are reflected to be arranged at the first optical unit.

Further, provision is additionally or alternatively made in one embodiment of the optical system according to the disclosure for the first optical unit of the image stabilizing unit to be embodied as a plane mirror, for example as a first plane mirror, wherein the plane mirror has a mirror surface, for example a first mirror surface. A plane mirror is a mirror that is reflecting on a light incidence side, the reflecting surface of which is planar, i.e., approximately corresponds to a flat surface.

In one embodiment of the optical system according to the disclosure, provision is additionally or alternatively made for a system, for example a first system, formed by the first optical unit of the first image stabilizing unit and a holder, for example a first holder, for the first optical unit to have a center of gravity, for example a first center of gravity, the first axis of rotation running through the center of gravity. The center of gravity is the center of mass of the system. In a further embodiment, provision is additionally or alternatively made for a system formed by the second optical unit of the first image stabilizing unit and a holder for the second optical unit to have a center of gravity, the second axis of rotation running through the center of gravity. The center of gravity is the center of mass of the system. An advantage of the aforementioned embodiment is that the image stabilizing unit is basically mounted in equilibrium. Consequently, less torque in comparison with the prior art is needed to rotate the first optical unit of the image stabilizing unit, and so there are low mechanical requirements in respect of the drive unit for moving the first optical unit and a lower power consumption in comparison with the prior art is obtained if an electrically operated drive unit is used.

In a further embodiment of the optical system according to the disclosure, provision is additionally or alternatively made for the first optical axis to intersect a first mirror unit of the first optical unit of the image stabilizing unit at a point of intersection, for example a first point of intersection, the first axis of rotation running through the point of intersection. A point of incidence of the first optical axis is located just above the center of a plane surface of the first mirror unit. The mirror unit of the first optical unit of the image stabilizing unit can have a center, for example a first center, the first axis of rotation running through the center. The two last-mentioned embodiments are chosen, for example, if particularly good imaging should be obtained using the optical system.

In yet a further embodiment of the optical system according to the disclosure, provision is additionally or alternatively made for the first axis of rotation, about which the first optical unit rotates, to intersect a plane. By way of example, the plane is a first plane. Further, provision is made in this yet further embodiment for the second axis of rotation, about which the second optical unit rotates, to lie in the aforementioned plane. By way of example, provision is made for the first axis of rotation to be aligned along an x-axis of a coordinate system, the coordinate system being given by the x-axis, a y-axis and a z-axis. The x-axis, the y-axis and the z-axis are aligned perpendicular to one another and have a common point of intersection in the form of a coordinate origin. Then, the second axis of rotation lies in a plane spanned by the y-axis and the z-axis. This is the yz-plane. By way of example, light beams are deflected in the optical system according to the disclosure in the case of a rotation of the first optical unit about the first axis of rotation in the form of the x-axis, in such a way that this brings about a displacement of the image in the image plane along the y-axis. This can counteract a displacement along the y-axis of the image generated by the optical system according to the disclosure. Accordingly, there is a stabilization along the y-axis. By rotating the second optical unit about the second axis of rotation, which lies in the aforementioned plane, light beams are deflected in the optical system according to the disclosure, in such a way that this brings about a displacement of the image generated by the optical system according to the disclosure in the image plane of the optical system according to the disclosure along the x-axis. Accordingly, there is a stabilization of the image along the x-axis.

In addition to the aforementioned intended displacement of the image along the x-axis, a rotation of the second optical unit of the image stabilizing unit about any axis, for example any axis in the yz-plane, may also bring about an unwanted rotation of the image generated with the optical system according to the disclosure. To avoid this unwanted rotation, one embodiment of the optical system according to the disclosure additionally or alternatively provides for the second axis of rotation to correspond to an axis, wherein no unwanted rotation of the image is caused by a rotation of the second optical unit about this axis. By way of example, the second axis of rotation is aligned perpendicular to the mirror surface or to a surface of light incidence of the first optical unit of the image stabilizing unit in a non-stabilized state of the optical system according to the disclosure. The non-stabilized state is present when there is no image stabilization. In this embodiment, there is only a displacement of the image along the x-axis. Accordingly, there is no bothersome rotation of the image. In a further embodiment of the optical system according to the disclosure, provision is additionally or alternatively made for the second axis of rotation to be aligned at an angle of 50° to 130° or of 60° to 120° or of 70° to 110° or of 80° to 100° with respect to the mirror surface or a surface of the light incidence of the first optical unit of the image stabilizing unit in the non-stabilized state of the optical system according to the disclosure, wherein the range boundaries are included in the aforementioned ranges.

In a further embodiment of the optical system according to the disclosure, provision is additionally or alternatively made for the optical system to have one of the following features:

an image capture unit, for example a first image capture unit, is arranged in the im-age plane;

an image capture unit, for example a first image capture unit, is arranged in the im-age plane, said image capture unit being embodied as an image sensor in particular, more particularly as a semiconductor-based image sensor;

the optical system comprises at least one eyepiece, for example a first eyepiece, wherein, as seen from the objective in the direction of the image plane, the image plane is arranged first and then the eyepiece. Consequently, as seen from the objective in the direction of the image plane, the aforementioned embodiment has the following sequence of individual units: the objective—the image stabilizing unit—the image plane—the eyepiece. In a further embodiment, provision is made for the im-age plane of the objective and the image plane of the eyepiece to coincide.

In yet a further embodiment of the optical system according to the disclosure, provision is additionally or alternatively made for the optical system to comprise a housing, for example a first housing, wherein the objective, the image stabilizing unit and the image plane are arranged in this housing. In addition or as an alternative thereto, provision is made in a further embodiment of the optical system according to the disclosure for the eyepiece to be arranged in the housing.

In yet a further embodiment of the optical system according to the disclosure, provision is additionally or alternatively made for the image stabilizing unit to be embodied as an erecting system, for example as a first erecting system. In particular, provision is made for the image stabilizing unit to be embodied as a prism erecting system, for example as a first prism erecting system, or as a lens erecting system, for example as a first lens erecting system. By way of example, the prism erecting system comprises at least one prism. By way of example, the lens erecting system comprises at least one lens.

In a further embodiment of the optical system according to the disclosure, provision is additionally or alternatively made for the optical system to have one of the following features:

at least one drive unit, for example a first drive unit, for moving the first optical unit and/or the second optical unit of the image stabilizing unit;

at least one drive unit, for example a first drive unit, for moving the first optical unit and/or the second optical unit of the image stabilizing unit, wherein the drive unit has at least one piezoceramic, for example a first piezoceramic;

at least one drive unit, for example a first drive unit, for moving the first optical unit and/or the second optical unit of the image stabilizing unit, wherein the drive unit has at least one piezo actuator, for example a first piezo actuator;

at least one drive unit, for example a first drive unit, for moving the first optical unit and/or the second optical unit of the image stabilizing unit, wherein the drive unit has at least one piezo bender actuator, for example a first piezo bender actuator;

at least one drive unit, for example a first drive unit, for moving the first optical unit and/or the second optical unit of the image stabilizing unit, wherein the drive unit has at least one piezo ultrasonic actuator, for example a first piezo ultrasonic actuator;

at least one drive unit, for example a first drive unit, for moving the first optical unit and/or the second optical unit of the image stabilizing unit, wherein the drive unit has at least one piezo traveling wave actuator, for example a first piezo traveling wave actuator;

at least one drive unit, for example a first drive unit, for moving the first optical unit and/or the second optical unit of the image stabilizing unit, wherein the drive unit has at least one motor, for example a first motor. By way of example, the motor is embodied as a DC motor, as a stepper motor or as a voice coil motor;

at least one drive unit, for example a first drive unit, for moving the first optical unit and/or the second optical unit of the image stabilizing unit and also at least one control and/or adjustment unit for control/adjustment of the drive unit.

Deliberations have yielded that the embodiment of at least one of the aforementioned drive units as a drive unit based on piezo technology is particularly advantageous. Such drive unit have a low power consumption. Further, when a control voltage is deactivated, such drive units have such a sufficiently large holding force that a movably arranged image stabilizing unit need not be additionally locked. Securing a movable image stabilizing unit is desirable when the optical system is not in use in order to avoid damage to the image stabilizing unit and/or to still be able to use the optical system (for example binoculars) as binoculars even if the stabilization function is deactivated. A further advantage of such drive unit is that the movement of such drive units is very precise on account of the direct dependence on the supplied control voltage. Accordingly, movements of the aforementioned movable image stabilizing units can be controlled quite accurately. The aforementioned drive units provide relatively little driving force, which is not necessarily sufficient for the adjustment of image stabilizing units according to the prior art.

In yet a further embodiment of the optical system according to the disclosure, provision is additionally or alternatively made for the optical system to have at least one motion detector, for example a first motion detector, for ascertaining a movement of the optical system, for example a rotational and/or a translational trembling movement. By way of example, the first motion detector is embodied as a rate sensor, as a gyroscope sensor or as a magnetometer. Explicit reference is made to the fact that the disclosure is not restricted to the use of the aforementioned motion detectors. Rather, any motion detector suitable for the disclosure can be used.

In one embodiment of the optical system according to the disclosure, provision is additionally or alternatively made for the second optical unit of the image stabilizing unit to be embodied as a mirror system, for example as a first prism. By way of example, the mirror system is embodied as a device with a reflecting surface, in particular made of at least one mirror, or as the first prism. In particular, provision is made for the second optical unit of the image stabilizing unit to be embodied as a roof prism, for example as a first roof prism. In particular, the aforementioned first roof prism is embodied as a Bauernfeind prism with a roof edge. In a further embodiment, provision is additionally or alternatively made for the roof edge of the first roof prism to be embodied like a roof edge of an Amici prism. In yet a further embodiment, provision is additionally or alternatively made for light beams incident into the first roof prism to be reflected three times within the first roof prism, specifically initially at a first surface of the roof edge of the first roof prism, then at a second surface of the roof edge of the first roof prism and subsequently at a third surface of the first roof prism. What is described above is illustrated in FIG. 3, which is explained further below. In FIG. 3, only two of the three reflections are visible on account of a two-dimensional view since two reflections at the roof edge overlap and are therefore visible as one reflection.

If the optical system according to the disclosure comprises a plurality of optical channels or a plurality of optical subsystems, provision is made in a further embodiment of the optical system according to the disclosure for the optical system according to the disclosure to comprise at least one second objective, at least one second image stabilizing unit and at least one second image plane. As seen from the second objective in the direction of the second image plane, the second objective is arranged first along a second optical axis of the optical system, followed by the second image stabilizing unit and then the second image plane. Expressed differently, the second image stabilizing unit is arranged between the second objective and the second image plane. In one embodiment, provision is made for the second objective to be embodied for focusing purposes and for at least one unit of the second objective to be displaced, for example along the second optical axis, for focusing purposes. In a further embodiment, provision is made for the second objective to comprise at least one second front unit and at least one second focusing unit, wherein the second focusing unit is displaced along the second optical axis for focusing purposes. In yet another alternative, provision is made for the focusing to be implemented by a second eyepiece, which is provided, e.g., on the optical system and which will be discussed in more detail below.

The second image stabilizing unit comprises at least one third optical unit and at least one fourth optical unit. In principle, the third optical unit is a first optical unit of the second image stabilizing unit and the fourth optical unit is a second optical unit of the second image stabilizing unit. By way of example, the third optical unit of the second image stabilizing unit is arranged between the second objective and the fourth optical unit of the second image stabilizing unit. Further, the third optical unit of the second image stabilizing unit is embodied so as to be rotatable about a third axis of rotation. Provision is made for the third axis of rotation to be the only axis of rotation about which the third optical unit of the second image stabilizing unit rotates. Accordingly, provision is made in this embodiment for the third optical unit not to rotate about any further axis of rotation. In particular, provision is made for the third axis of rotation to be the only axis about which the third optical unit of the second image stabilizing unit rotates. Accordingly, provision is made in this embodiment for the third optical unit not to rotate about any further axis of rotation other than the third axis of rotation. The fourth optical unit of the second image stabilizing unit is embodied so as to be rotatable about a fourth axis of rotation. By way of example, provision is made in one embodiment of the disclosure for the third axis of rotation and the fourth axis of rotation to be different axes. Expressed differently, the third axis of rotation and the fourth axis of rotation are not parallel. Since the third axis of rotation and the fourth axis of rotation are different axes in this embodiment, the rotation of the third optical unit of the second image stabilizing unit about the third axis of rotation and the rotation of the fourth optical unit of the second image stabilizing unit about the fourth axis of rotation can be implemented independently of one another in this embodiment. Expressed differently, a rotation of the third optical unit of the second image stabilizing unit about the third axis of rotation does not necessarily cause a rotation of the fourth optical unit of the second image stabilizing unit about the fourth axis of rotation. Rather, a rotation of the third optical unit of the second image stabilizing unit about the third axis of rotation may optionally cause a rotation of the fourth optical unit of the second image stabilizing unit about the fourth axis of rotation.

Further, provision is made in the optical system according to the disclosure for the fourth optical unit of the second image stabilizing unit to be a second optical roof edge unit. By way of example, the fourth optical unit of the second image stabilizing unit is embodied as a second mirror system and/or as a second roof prism. Expressed differently, the fourth optical unit of the second image stabilizing unit can be embodied as a direct-vision optical unit without a beam offset or with only a small beam offset. In respect of the embodiment of the second roof prism, reference is also made to the explanations above and below which also apply here in analogous fashion.

As already described above, the second image stabilizing unit comprises the third optical unit and the fourth optical unit. Stabilization of an image, generated by the optical system according to the disclosure, in a first direction is obtained by rotating the third optical unit about the third axis of rotation. The stabilization of an image, generated by the optical system according to the disclosure, in a second direction, which for example is aligned perpendicular to the first direction, is implemented by rotating the fourth optical unit about the fourth axis of rotation. This is discussed in more detail further below.

In one embodiment of the optical system according to the disclosure, provision is additionally or alternatively made for the fourth axis of rotation, about which the fourth optical unit of the second image stabilizing unit is rotated, to be aligned at an angle of 10° to 89° with respect to the second optical axis, with the range boundaries being included in the aforementioned range. In particular, provision is made for the fourth axis of rotation to be aligned at an angle of 20° to 80° or at an angle of 30° to 70° or at an angle of 40° to 60° with respect to the second optical axis, with the range boundaries being included in the aforementioned ranges. In a further embodiment, provision is made, e.g., for the fourth axis of rotation to be aligned at an angle of 62.5° with respect to the second optical axis. It was found that the aforementioned alignments of the fourth axis of rotation with respect to the second optical axis cause no image field rotation or only a small bothersome image field rotation. Consequently, the aforementioned alignments are particularly well suited to image stabilization.

In one embodiment of the optical system according to the disclosure, provision is additionally or alternatively made for the optical system according to the disclosure to have one of the following features:
  the third optical unit of the second image stabilizing unit is arranged between the second objective and the fourth optical unit of the second image stabilizing unit;
  the fourth optical unit of the second image stabilizing unit is arranged be-tween the second objective and the third optical unit of the second image stabilizing unit.

In one embodiment of the optical system according to the disclosure, provision is additionally or alternatively made for the third optical unit of the second image stabilizing unit to com-prise at least one second mirror, at least one second plane mirror, and/or at least one second prism.

Further, provision is additionally or alternatively made in the optical system according to the disclosure for the third optical unit of the second image stabilizing unit to be embodied as a second plane mirror, wherein the second plane mirror has a second mirror surface.

In a further embodiment of the optical system according to the disclosure, provision is additionally or alternatively made for the third optical unit of the second image stabilizing unit to have an individual surface at which light rays incident on the surface are reflected. By way of example, provision is made for the third optical unit of the second image stabilizing unit to have a single surface at which light rays incident on the surface are reflected. Expressed differently, this further embodiment provides for no further surface at which incident light beams are reflected to be arranged at the third optical unit.

In one embodiment of the optical system according to the disclosure, provision is additionally or alternatively made for a second system formed by the third optical unit of the second image stabilizing unit and a second holder for the third optical unit to have a second center of gravity, the third axis of rotation running through the second center of gravity. The second center of gravity is the center of mass of the second system. In one embodiment of the optical system according to the disclosure, provision is additionally or alternatively made for a system formed by the fourth optical unit of the second image stabilizing unit and a holder for the fourth optical unit to have a center of gravity, the fourth axis of rotation running through the center of gravity. The center of gravity is the center of mass of the system. An advantage of the aforementioned embodiment is that the second image stabilizing unit is basically mounted in equilibrium. Consequently, less torque than in the prior art is needed to rotate the third optical unit of the second image stabilizing unit, and so there are low mechanical requirements in respect of a drive unit for moving the third optical unit and a lower power consumption in comparison with the prior art is obtained if an electrically operated drive unit is used.

In a further embodiment of the optical system according to the disclosure, provision is additionally or alternatively made for the second optical axis to intersect a second mirror unit of the third optical unit of the second image stabilizing unit at a second point of intersection, the third axis of rotation running through the second point of intersection. A point of incidence of the second optical axis is located just above the center of a plane surface of the second mirror unit. The second mirror unit of the third optical unit of the second image stabilizing unit has a second center, the third axis of rotation running through the second center. The two last-mentioned embodiments are chosen, for example, if particularly good imaging should be obtained using the optical system.

In yet a further embodiment of the optical system according to the disclosure, provision is additionally or alternatively made for the third axis of rotation, about which the third optical unit rotates, to intersect a second plane. Further, provision is made in this yet further embodiment for the fourth axis of rotation, about which the fourth optical unit rotates, to lie in the aforementioned second plane. By way of example, provision is a made for the third axis of rotation to be aligned along the x-axis of the coordinate system. Then, the fourth axis of rotation lies in the plane spanned by the y-axis and the z-axis. This is the yz-plane. By way of example, light beams are deflected in the optical system according to the disclosure in the case of a rotation of the third optical unit about the third axis of rotation in the form of the x-axis, in such a way that this brings about a displacement of the image along the y-axis. This can counteract a displacement along the y-axis of the image in the image plane generated by the optical system according to the disclosure. Accordingly, there is a stabilization of the image along the y-axis. By rotating the fourth optical unit about the fourth axis of rotation, which lies in the aforementioned plane, light beams are deflected in the optical system according to the disclosure, in such a way that this brings about a displacement of the image generated by the optical system according to the disclosure in the image plane of the optical system according to the disclosure along the x-axis. Accordingly, there is a stabilization of the image along the x-axis.

In addition to the aforementioned intended displacement of the image along the x-axis, a rotation of the fourth optical unit of the second image stabilizing unit about any axis, for example any axis in the yz-plane, may also bring about an unwanted rotation of the image generated with the optical system according to the disclosure. To avoid this unwanted rotation, one embodiment of the optical system according to the disclosure additionally or alternatively provides for the fourth axis of rotation to correspond to an axis, wherein no unwanted rotation of the image is caused by a rotation of the fourth optical unit about this axis. By way of example, the fourth axis of rotation is aligned perpendicular to the second mirror surface or to a surface of light incidence of the third optical unit of the second image stabilizing unit in a non-stabilized state of the optical system according to the disclosure. The non-stabilized state is present when there is no image stabilization. In this embodiment, there is only a displacement of the image along the x-axis. Accordingly, there is no bother-some rotation of the image. In a further embodiment of the optical system according to the disclosure, provision is additionally or alternatively made for the fourth axis of rotation to be aligned at an angle of 50° to 130° or of 60° to 120° or of 70° to 110° or of 80° to 100° with respect to the mirror surface or a surface of the light incidence of the third optical unit of the second image stabilizing unit in the non-stabilized state of the optical system according to the disclosure, wherein the range boundaries are included in the aforementioned ranges.

In a further embodiment of the optical system according to the disclosure, provision is additionally or alternatively made for the optical system according to the disclosure to have one of the following features:
- a second image capture unit is arranged in the second image plane;
- a second image capture unit is arranged in the second image plane, said image capture unit being embodied as an image sensor in particular, more particularly as a semiconductor-based image sensor;
- the optical system comprises at least one second eyepiece, wherein, as seen from the second objective in the direction of the second image plane, the second image plane is arranged first and then the second eyepiece. Consequently, as seen from the second objective in the direction of the second image plane, the aforementioned embodiment has the following sequence of individual units: the second objective—the second image stabilizing unit—the second image plane—the second eyepiece. In a further embodiment, provision is made for the second image plane of the second objective and the second image plane of the second eyepiece to coincide.

In a further embodiment of the optical system according to the disclosure, provision is additionally or alternatively made for the optical system to comprise a second housing, wherein the second objective, the second image stabilizing unit and the second image plane are arranged in this second housing. In addition or as an alternative thereto, provision is made in a further embodiment of the optical system according to the disclosure for the second eyepiece to be arranged in the second housing.

In yet a further embodiment of the optical system according to the disclosure, provision is additionally or alternatively made for the second image stabilizing unit to be embodied as a second erecting system. In particular, provision is made for the second image stabilizing unit to be embodied as a second prism erecting system or as a second lens erecting system. What was already stated above applies in respect of the erecting systems.

In a further embodiment of the optical system according to the disclosure, provision is additionally or alternatively made for the optical system to have one of the following features:
- at least one second drive unit for moving the third optical unit and/or the fourth optical unit of the second image stabilizing unit;
- at least one second drive unit for moving the third optical unit and/or the fourth optical unit of the second image stabilizing unit, wherein the second drive unit has at least one second piezoceramic;
- at least one second drive unit for moving the third optical unit and/or the fourth optical unit of the second image stabilizing unit, wherein the second drive unit has at least one second piezo actuator;
- at least one second drive unit for moving the third optical unit and/or the fourth optical unit of the second image stabilizing unit, wherein the second drive unit has at least one second piezo bender actuator;
- at least one second drive unit for moving the third optical unit and/or the fourth optical unit of the second image stabilizing unit, wherein the second drive unit has at least one second piezo ultrasonic actuator;
- at least one second drive unit for moving the third optical unit and/or the fourth optical unit of the second image stabilizing unit, wherein the second drive unit has at least one second piezo traveling wave actuator;
- at least one second drive unit for moving the third optical unit and/or the fourth optical unit of the second image stabilizing unit, wherein the second drive unit has at least one second motor. By way of example, the second motor is embodied as a DC motor, as a stepper motor or as a voice coil motor;
- at least one second drive unit, for moving the third optical unit and/or the fourth optical unit of the second image stabilizing unit and at least one second control and/or adjustment unit for control/adjustment of the second drive unit.

Deliberations have yielded that the embodiment of at least one of the aforementioned drive units as a drive unit based on piezo technology is particularly advantageous. In this respect, reference is made to the explanations further above.

In yet a further embodiment of the optical system according to the disclosure, provision is additionally or alternatively made for the optical system to have at least one second motion detector, for ascertaining a movement of the optical system, for example a rotational and/or a translational trembling movement. By way of example, the second motion detector is embodied as a rate sensor, as a gyroscope sensor or as a magnetometer. Explicit reference is made to the fact that the disclosure is not restricted to the use of the aforementioned motion detectors. Rather, any motion detector suitable for the disclosure can be used.

In one embodiment of the optical system according to the disclosure, provision is additionally or alternatively made for the fourth optical unit of the second image stabilizing unit to be embodied as a second mirror system. In particular, provision is made for the fourth optical unit of the second image stabilizing unit to be embodied as a second roof prism. In particular, the aforementioned second roof prism is embodied as a Bauernfeind prism with a roof edge. In a further embodiment, provision is additionally or alternatively made for the roof edge of the second roof prism to be embodied like a roof edge of an Amici prism. In yet a further embodiment, provision is additionally or alternatively made for light beams incident into the second roof prism to be reflected three times within the second roof prism, specifically initially at a first surface of the roof edge of the second roof prism, then at a second surface of the roof edge of the second roof prism and subsequently at a third surface of the second roof prism.

In a further embodiment of the optical system according to the disclosure, provision is additionally or alternatively made for the first housing to be embodied as a tube. In addition or as an alternative thereto, provision is made for the second housing to be embodied as a tube.

The embodiments of the optical system according to the disclosure having two housings basically have two optical subsystems. Thus, a first optical subsystem (for example, for one of the two eyes of a user) is arranged in the first housing. By contrast, a second optical subsystem (for example, for the other of the two eyes of a user) is arranged in the second housing.

In yet a further embodiment of the optical system according to the disclosure, provision is additionally or alternatively made for the first housing to be connected to the second housing by way of at least one folding bridge. The folding bridge comprises at least one first hinge part arranged on the first housing. Further, the folding bridge comprises at least one second hinge part arranged on the second housing. The folding bridge allows the optical system to be adjusted in such a way that the first housing and the second housing can be adjusted to the distance between the eyes of a user. Accordingly, the first housing and the second housing are arranged relative to one another in such a way that the first housing is arranged in front of one of the two eyes of the user and the second housing is arranged in front of the other of the two eyes of the user. Put another way, this can be expressed as follows: The first eyepiece has a first eyepiece axis; by contrast, the second eyepiece has a second eyepiece axis. The first eye of a user has a first eye axis and the second eye of a user has a second eye axis. Accordingly, the first housing and the second housing are arranged relative to one another in such a way that the first eyepiece axis and the first eye axis are aligned and the second eyepiece axis and the second eye axis are aligned. In the embodiment explained here, the use of a folding bridge renders setting an interpupillary distance with rhombic prisms unnecessary.

In one embodiment of the optical system according to the disclosure, provision is additionally or alternatively made for the optical system to comprise at least one sensor for identifying a folding angle of the folding bridge. By way of example, the first control and/or adjustment unit and/or the second control and/or adjustment unit are used to convert control and/or adjustment signals intended for the first drive unit from a first coordinate system into control and/or adjustment signals for the second drive unit in a second coordinate system on the basis of a coordinate transformation and/or further mathematical methods. This is advantageous, in particular, if the optical system according to the disclosure only comprises a single movement detector or only uses a single movement detector.

As already mentioned above, the optical system, in a further embodiment of the optical system according to the disclosure, comprises a single control and/or adjustment unit for control/adjustment of the first drive unit for moving the first optical unit and/or the second optical unit of the first image stabilizing unit and for control/adjustment of the second drive unit for moving the third optical unit and/or the fourth optical unit of the second image stabilizing unit. Therefore, this embodiment provides for a single control and/or adjustment unit for two drive units, specifically for the first drive unit and for the second drive unit.

In a further embodiment of the optical system according to the disclosure, provision is additionally or alternatively made for the first motion detector and the second motion detector to be arranged in the first housing. In yet a further embodiment of the optical system according to the disclosure, provision is additionally or alternatively made for the first motion detector and the second motion detector to be arranged in the second housing. In the aforementioned embodiments, the first motion detector detects a movement in a first direction and the second motion detector detects a movement in a second direction. Alternatively, provision is made for the first motion detector to be arranged in the first housing or for the second motion detector to be arranged in the second housing. In these embodiments, the first motion detector detects a movement both in at least one first direction and in at least one second direction and the second motion detector detects a movement both in at least one first direction and in at least one second direction.

As already mentioned above, one embodiment of the optical system according to the disclosure additionally or alternatively provides for the first image stabilizing unit to be embodied as a prism erecting system. By way of example, this embodiment of the optical system according to the disclosure provides for the first optical unit of the first image stabilizing unit to be embodied as a first prism and for the second optical unit of the first image stabilizing unit to be embodied as a second prism. The first prism may have at least one feature or a combination of features which was/were specified above or is/are specified below in respect of the first optical unit, in particular in respect of the first plane mirror. The second prism may have at least one feature or a combination of features which was/were specified above or is/are specified below in respect of the second optical unit. By way of example, the first prism has a surface within the first prism, at which light beams are deflected by way of total reflection or by way of a mirroring layer. In particular, provision is made in one embodiment of the optical system according to the disclosure for the first image stabilizing unit to be embodied as an Abbe-König prism system, as a Schmidt-Pechan prism system or as a Porro prism system. By way of example, the second prism is embodied as a roof prism.

As already mentioned above, a further embodiment of the optical system according to the disclosure additionally or alternatively provides for the second image stabilizing unit to be embodied as a prism erecting system. By way of example, this embodiment of the optical system according to the disclosure provides for the third optical unit of the second image stabilizing unit to be embodied as a third prism and for the fourth optical unit of the second image stabilizing unit to be embodied as a fourth prism. The third prism may have at least one feature or a combination of features which was/were specified above or is/are specified below in respect of the third optical unit, in particular in respect of the second plane mirror. The fourth prism may have at least one feature or a combination of features which was/were specified above or is/are specified below in respect of the fourth optical unit. By way of example, the third prism has a surface within the third prism, at which light beams are deflected by way of total reflection or by way of a mirroring layer. In particular, provision is made in one embodiment of the optical system according to the disclosure for the second image stabilizing unit to be embodied as an Abbe-König prism system, as a Schmidt-Pechan prism system or as a Porro prism system. By way of example, the fourth prism is embodied as a roof prism.

The disclosure also relates to a method for operating an optical system. An image is stabilized within the scope of the method. The optical system has at least one of the features specified further above or specified below or a combination of at least two of the features specified further above or specified below. The method includes the following steps:

capturing a movement of the optical system using the first motion detector and/or the second motion detector and generating a movement signal;

determining at least one of the following target positions of at least one of the following units by a computing unit of the optical system on the basis of the movement signal: (i) a first target position of the first optical unit of the first image stabilizing unit, (ii) a second target position of the second optical unit of the first image stabilizing unit, (iii) a third target position of the third optical unit of the second image stabilizing unit, and (iv) a fourth target position of the fourth optical unit of the second im-age stabilizing unit. In particular, the target positions are determined on the basis of different specifications and desired modes of operation, for example a specified strength of the stabilization and/or a specified use of the optical system, for example a use in a moving means of transportation;

determining at least one of the following actual positions of at least one of the following units using at least one first position sensor of the first drive unit and/or using at least one second position sensor of the second drive unit: (i) a first actual position of the first optical unit of the first image stabilizing unit, (ii) a second actual position of the second optical unit of the first image stabilizing unit, (iii) a third actual position of the third optical unit of the second image stabilizing unit, and (iv) a fourth actual position of the fourth optical unit of the second image stabilizing unit;

comparing the following positions using the first control and/or adjustment unit and/or the second control and/or adjustment unit: (i) the first actual position of the first optical unit of the first image stabilizing unit with the first target position of the first optical unit of the first image stabilizing unit, (ii) the second actual position of the second op-tical unit of the first image stabilizing unit with the second target position of the second optical unit of the first image stabilizing unit, (iii) the third actual position of the third optical unit of the second image stabilizing unit with the third target position of the third optical unit of the second image stabilizing unit, and (iv) the fourth actual position of the fourth optical unit of the second image stabilizing unit with the fourth target position of the fourth optical unit of the second image stabilizing unit; and carrying out at least one step of the following steps:
a) if the first actual position of the first optical unit of the first image stabilizing unit differs from the first target position of the first optical unit of the first image stabilizing unit, implementing control and/or adjustment of the first drive unit using the first control and/or adjustment unit and/or the second control and/or adjustment unit, in such a way that the first optical unit of the first image stabilizing unit is moved, in particular moved iteratively, into the first target position by way of a rotation about the first axis of rotation;
b) if the second actual position of the second optical unit of the first image stabilizing unit differs from the second target position of the second optical unit of the first im-age stabilizing unit, implementing control and/or adjustment of the first drive unit using the first control and/or adjustment unit and/or the second control and/or adjustment unit, in such a way that the second optical unit of the first image stabilizing unit is moved, in particular moved iteratively, into the second target position by way of a rotation about the second axis of rotation;
c) if the third actual position of the third optical unit of the second image stabilizing unit differs from the third target position of the third optical unit of the second image stabilizing unit, implementing control and/or adjustment of the second drive unit using the first control and/or adjustment unit and/or the second control and/or adjustment unit, in such a way that the third optical unit of the second image stabilizing unit is moved, in particular moved iteratively, into the third target position by way of a rotation about the third axis of rotation;
d) if the fourth actual position of the fourth optical unit of the second image stabilizing unit differs from the fourth target position of the fourth optical unit of the second image stabilizing unit, implementing control and/or adjustment of the second drive unit using the first control and/or adjustment unit and/or the second control and/or adjustment unit, in such a way that the fourth optical unit of the second image stabilizing unit is moved, in particular moved iteratively, into the fourth target position by way of a rotation about the fourth axis of rotation.

The first control and/or adjustment unit can be embodied as a first PID controller. Further, the second control and/or adjustment unit can be embodied as a second PID controller.

BRIEF DESCRIPTION OF THE DRAWINGS

The disclosure will now be described with reference to the drawings wherein.

DESCRIPTION OF EXEMPLARY EMBODIMENTS

Exemplary embodiments of the disclosure are explained below. A first embodiment of an optical system is a pair of binoculars 1 (only referred to as binoculars below). However, explicit reference is made to the fact that the disclosure is not restricted to binoculars. Rather, the disclosure is suitable for any optical system, for example also for a telescope, as will still be explained in more detail further below. By way of example, provision is made for embodiments explained below to have at least one of the features specified further above or a combination of at least two of the features specified further above.

Figure 1:
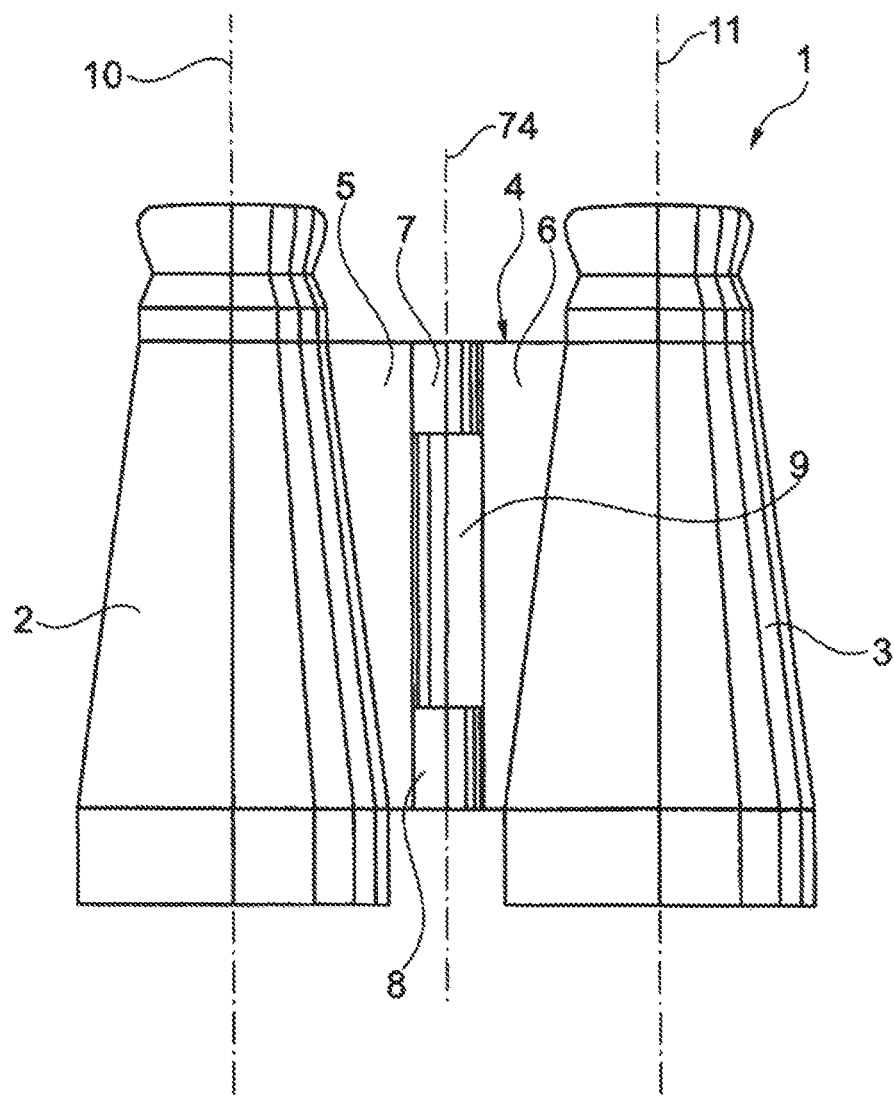
FIG. 1 shows a schematic illustration of an optical system in the form of binoculars with a folding bridge.

FIG. 1 shows a first schematic illustration of the pair of binoculars 1, which have a tubular first housing 2 and a tubular second housing 3. A first optical axis 10 runs through the first housing 2. By contrast, a second optical axis 11 runs through the second housing 3. The first housing 2 and the second housing 3 are interconnected by way of a folding bridge 4. The folding bridge 4 comprises a first hinge part 5, which is arranged at the first housing 2. Further, the folding bridge 4 comprises a second hinge part 6, which is arranged at the second housing 3. The first hinge part 5 comprises a first holding part 7 and a second holding part 8, between which a third holding part 9 of the second hinge part 6 is arranged. An axle pin (not illustrated) extends through the first holding part 7, the second holding part 8 and the third holding part 9 such that the relative position of the first housing 2 and the second housing 3 can be set with respect to one another about an articulation axis 74. This renders it possible to set the first housing 2 and the second housing 3 to the interpupillary distance of a user such that, firstly, the first housing 2 is arranged in front of one of the two eyes of the user and such that, secondly, the second housing 3 is arranged in front of the other one of the two eyes of the user.

Figure 2:
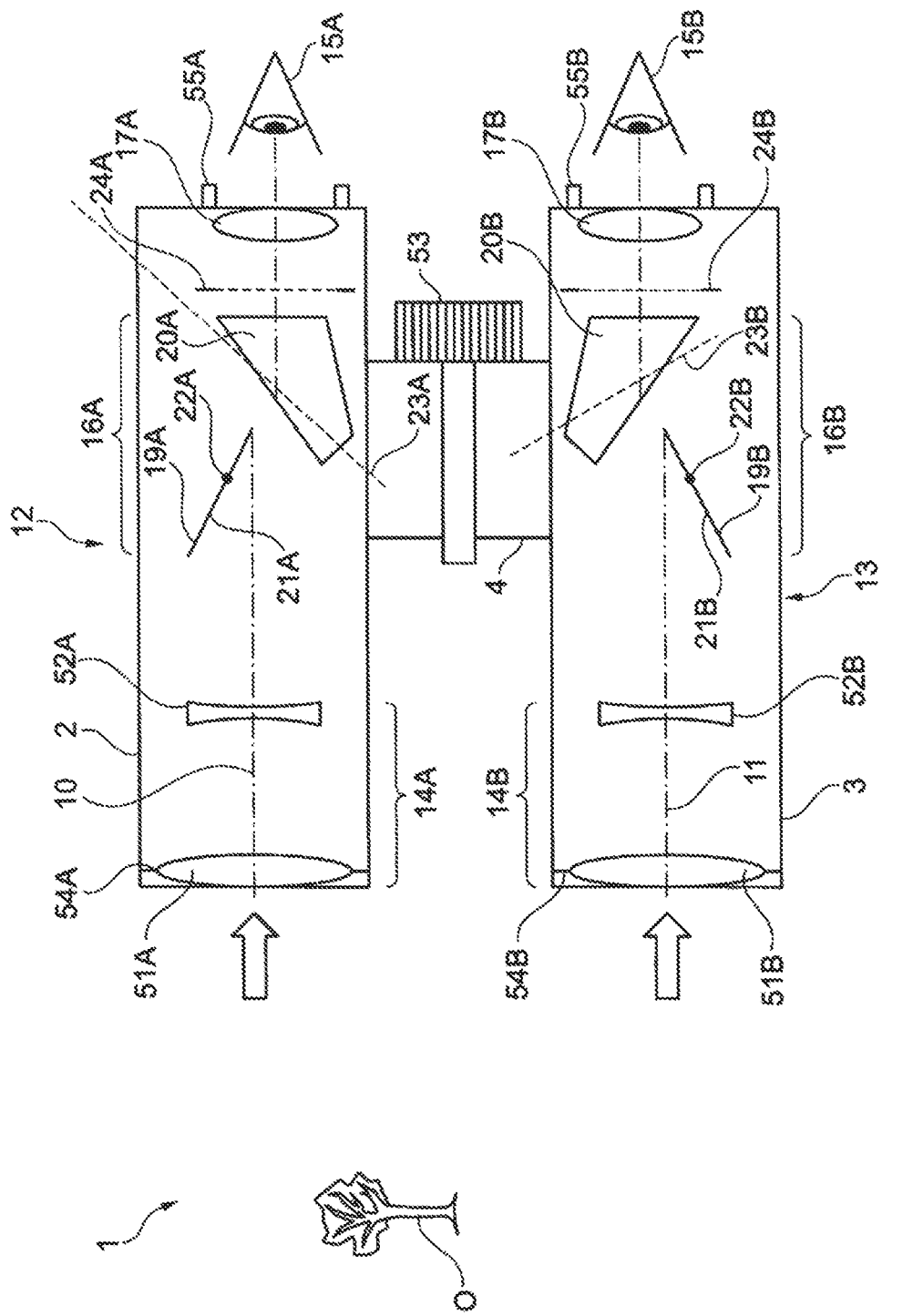
FIG. 2 shows a further schematic illustration of the binoculars according to FIG. 1.

FIG. 2 shows a further illustration of the binoculars 1. The first housing 2 comprises a first optical subsystem 12. The first optical subsystem 12 is provided with a first objective 14A, with a first image stabilizing unit 16A and with a first eyepiece 17A.

A first eye 15A of a user can be arranged at the first eyepiece 17A for the purposes of observing an object O. The first optical axis 10 of the first optical subsystem 12 is slightly offset in the lateral direction on account of the first image stabilizing unit 16A, and so the first optical axis 10 has a stepped form.

In this embodiment, the first objective 14A comprises a first front unit 51A and a first focusing unit 52A. Further embodiments of the first objective 14A provide for a different number of single lenses or cemented elements consisting of lenses. Either the first eyepiece 17A or the first focusing unit 52A can be axially displaced along the first optical axis 10 for the purposes of focusing on the object O observed through the binoculars 1. In a further embodiment, the first front unit 51A or even the entire first objective 14A is displaced along the first optical axis 10. In a further embodiment, the first front unit 51A and the first focusing unit 52A are displaced relative to one another.

The first image stabilizing unit 16A comprises a first optical unit 19A and a second optical unit 20A. The first optical unit 19A is arranged between the first objective 14A and the second optical unit 20A. In this embodiment, the first optical unit 19A is embodied as a first planar mirror, wherein the first optical unit 19A has a first mirror surface 21A on a side of light incidence. The second optical unit 20A is embodied as a roof prism. By way of example, the roof prism has at least one of the features specified further above in respect of the roof prism or a combination of at least two of the features specified further above in respect of the roof prism.

The first optical unit 19A of the first image stabilizing unit 16A is embodied so as to be rotatable about a first axis of rotation 22A, the first axis of rotation 22A running at right angles into the plane of the drawing. The first axis of rotation 22A is the only axis of rotation about which the first optical unit 19A of the first image stabilizing unit 16A rotates. Accordingly, provision is made in this embodiment for the first optical unit 19A not to rotate about any further axis of rotation. The second optical unit 20A of the first image stabilizing unit 16A is embodied so as to be rotatable about a second axis of rotation 23A. In this embodiment, provision is made for the first axis of rotation 22A and the second axis of rotation 23A to be different axes. This will still be discussed in more detail further below. In a further embodiment, provision is made for the first optical unit 19A to have an individual surface at which light rays incident on the surface are reflected. By way of example, provision is made for the first optical unit 19A to have a single surface at which light rays incident on the surface are reflected. Expressed differently, this further embodiment provides for no further surface at which incident light beams are reflected to be arranged at the first optical unit 19A.

The second housing 3 comprises a second optical subsystem 13. The second optical subsystem 13 is provided with a second objective 14B, with a second image stabilizing unit 16B and with a second eyepiece 17B. A second eye 15B of the user can be arranged at the second eyepiece 17B for the purposes of observing the object O. The second optical axis 11 of the second optical subsystem 13 is slightly offset in the lateral direction on account of the second image stabilizing unit 16B, and so the second optical axis 11 has a stepped form.

In this embodiment, the second objective 14B comprises a second front unit 51B and a second focusing unit 52B. Further embodiments of the second objective 14B provide for a different number of single lenses or cemented elements consisting of lenses. Either the second eyepiece 17B or the second focusing unit 52B can be axially displaced along the second optical axis 11 for the purposes of focusing on the object O observed through the binoculars 1. In a further embodiment, the second front unit 51B or even the entire second objective 14B is displaced along the second optical axis 11. In a further embodiment, the second front unit 51B and the second focusing unit 52B are displaced relative to one another.

The second image stabilizing unit 16B comprises a third optical unit 19B and a fourth optical unit 20B. The third optical unit 19B is arranged between the second objective 14B and the fourth optical unit 20B. In this embodiment, the third optical unit 19B is embodied as a second planar mirror, wherein the third optical unit 19B has a second mirror surface 21B on a side of light incidence. The fourth optical unit 20B is embodied as a roof prism. By way of example, the roof prism has at least one of the features specified further above in respect of the roof prism or a combination of at least two of the features specified further above in respect of the roof prism.

The third optical unit 19B of the second image stabilizing unit 16B is embodied so as to be rotatable about a third axis of rotation 22B, the third axis of rotation 22B running at right angles into the plane of the drawing. The third axis of rotation 22B is the only axis of rotation about which the third optical unit 19B of the second image stabilizing unit 16B rotates. Accordingly, provision is made in this embodiment for the third optical unit 19B not to rotate about any further axis of rotation. The fourth optical unit 20B of the second image stabilizing unit 16B is embodied so as to be rotatable about a fourth axis of rotation 23B. In this embodiment, provision is made for the third axis of rotation 22B and the fourth axis of rotation 23B to be different axes. This will still be discussed in more detail further below.

In a further embodiment, provision is made for the third optical unit 19B to have an individual surface at which light rays incident on the surface are reflected. By way of example, provision is made for the third optical unit 19B to have a single surface at which light rays incident on the surface are reflected. Expressed differently, this further embodiment provides for no further surface at which incident light beams are reflected to be arranged at the third optical unit 19B.

In both of the optical subsystems 12, 13 presented above, the beam direction of the light beams incident into the optical subsystems 12, 13 is as follows: Object O—objective 14A, 14B—image stabilizing unit 16A, 16B—eyepiece 17A, 17B—eye 15A, 15B.

For focusing purposes, a rotary knob 53 is arranged on the folding bridge 4 in the embodiment illustrated here, with which rotary knob the first focusing unit 52A and the second focusing unit 52B can be displaced together along the first optical axis 10 and the second optical axis 11. In a further embodiment, provision is made for the first objective 14A and the second objective 14B (or at least units of the first objective 14A and of the second objective 14B) to be adjusted relative to one another.

In the embodiment illustrated here, both the first objective 14A and the second objective 14B generate a real image, upside-down relative to the observed object O, in an image plane associated with the respective objective 14A, 14B. The first image stabilizing unit 16A assigned to the first objective 14A is a first erecting system. Further, the second image stabilizing unit 16B assigned to the second objective 14B is a second erecting system. Both aforementioned erecting systems are used for image erection. Hence the upside-down image is re-erected and imaged in a new image plane, in a first intermediate image plane 24A in the first housing 2 or in a second intermediate image plane 24B in the second housing 3. By way of example, a first field stop that sharply delimits the field of view is arranged in the first intermediate image plane 24A. Further, a second field stop that sharply delimits the field of view can be arranged for example in the second intermediate image plane 24B.

The first eyepiece 17A is used for imaging the image of the first intermediate image plane 24A at any distance, e.g. infinity or a different distance. Further, the second eyepiece 17B is used for imaging the image of the second intermediate image plane 24B at any distance, e.g. infinity or a different distance.

A first aperture stop 54A of the first optical subsystem 12 and a second aperture stop 54B of the second optical subsystem 13 can be formed either by a mount of an optical element of the corresponding optical subsystem 12, 13, generally by the mount of the lenses of the first front unit 51A or of the second front unit 51B, or by a separate stop. It may be imaged in the beam direction through the corresponding optical subsystem 12 or 13 into a plane which lies in the beam direction behind the corresponding eyepiece 17A or 17B and is typically at a distance of 5 to 25 mm therefrom. This plane is referred to as the plane of the exit pupil.

In order to protect the user against laterally incident light, a pull-out, turn-out or foldable first eyecup 55A can be provided at the first eyepiece 17A and a pull-out, turn-out or foldable second eyecup 55B can be provided at the second eyepiece 17B.

Figure 3:
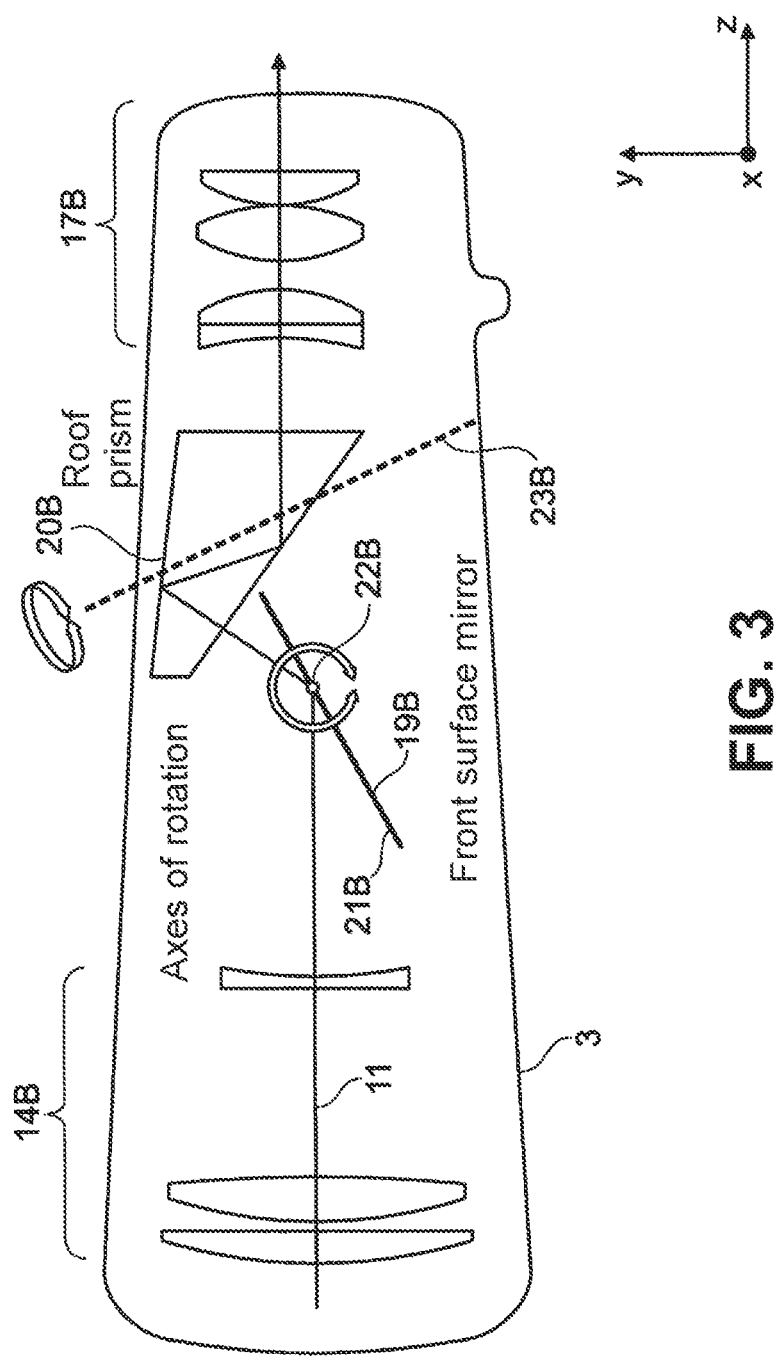
FIG. 3 shows a schematic illustration of a second optical subsystem.

FIG. 3 shows a schematic illustration of the second optical subsystem 13, which is arranged in the second housing 3.

FIG. 3 is based on the illustration of the second optical subsystem 13 of FIG. 2. Identical components are provided with identical reference signs. In principle, the first optical subsystem 12 arranged in the first housing 2 has an identical design to the second optical subsystem 13. Consequently, the explanations below with respect to the second optical subsystem 13 are also applicable to the first optical subsystem 12. If the optical system according to the disclosure is embodied for example as a monocular, as a telescope or as a spotting scope, the optical system in principle has the same design as shown in FIG. 3. Accordingly, the explanations given below also apply to these optical systems.

As already mentioned above, the third optical unit 19B of the second image stabilizing unit 16B is embodied so as to be rotatable about the third axis of rotation 22B, the third axis of rotation 22B running at right angles into the plane of the drawing. The fourth optical unit 20B of the second image stabilizing unit 16B is embodied so as to be rotatable about the fourth axis of rotation 23B. In this embodiment, provision is made for the third axis of rotation 22B and the fourth axis of rotation 23B to be different axes. By way of example, the fourth axis of rotation 23B is aligned in relation to the second optical axis 11 as is already been explained above.

A second system formed by the third optical unit 19B and a second holder for the third optical unit 19B of the second image stabilizing unit 16B has a second center of gravity, the third axis of rotation 22B running through the second center of gravity. The second center of gravity is the center of mass of the second system. This is advantageous in that the third optical unit 19B of the second image stabilizing unit 16B is in principle mounted in equilibrium. Consequently, less torque than in the prior art is needed to rotate the third optical unit 19B of the second image stabilizing unit 16B, and so there are low mechanical requirements in respect of a drive unit for moving the third optical unit 19B and a lower power consumption in comparison with the prior art is obtained if an electrically operated drive unit is used.

Further, in the embodiment of the disclosure explained here, provision is made for the second optical axis 11 to intersect the second mirror surface 21B of the third optical unit 19B of the second image stabilizing unit 16B at a second point of intersection, the third axis of rotation 22B running through the second point of intersection. A point of incidence of the second optical axis 11 is located just above the center of the second mirror surface 21B. The second mirror surface 21B of the third optical unit 19B of the second image stabilizing unit 16B can have a second center, the third axis of rotation 22B running through the second center. The two last-mentioned embodiments are chosen, for example, if particularly good imaging should be obtained using the optical system, for example the binoculars 1.

In one embodiment of the disclosure, provision is made for the third axis of rotation 22B, about which the third optical unit 19B rotates, to intersect a second plane. Further, provision is made in this embodiment for the fourth axis of rotation 23B, about which the fourth optical unit 20B rotates, to lie in the aforementioned second plane. By way of example, provision is made for the third axis of rotation 22B to be aligned along the x-axis of the above-described coordinate system. Then, the fourth axis of rotation 23B lies in the plane spanned by the y-axis and the z-axis. This is the yz-plane. By way of example, light beams are deflected in the second optical subsystem 13B in the case of a rotation of the third optical unit 19B about the third axis of rotation 22B in the form of the x-axis, in such a way that this brings about a displacement of the image in the image plane along the y-axis. This can counteract a displacement along the y-axis of the image generated by the second optical subsystem 13. Accordingly, there is a stabilization of the image along the y-axis. By rotating the fourth optical unit 20B about the fourth axis of rotation 23B, which lies in the aforementioned plane, light beams are deflected in the second optical subsystem 13, in such a way that this brings about a displacement of the image generated by the optical subsystem 13 in the image plane along the x-axis. Accordingly, there is a stabilization of the image along the x-axis.

In addition to the aforementioned intended displacement of the image along the x-axis, a rotation of the fourth optical unit 20B of the second image stabilizing unit 16B about any axis, for example any axis in the yz-plane, may also bring about an unwanted rotation of the image generated with the second optical subsystem 13. To avoid this unwanted rotation, one embodiment provides for the fourth axis of rotation 23B to be aligned perpendicular to the second mirror surface 21B of the third optical unit 19B of the second image stabilizing unit 16B in the case of a non-stabilized state of the second optical subsystem 13. The non-stabilized state is present when there is no image stabilization. In this embodiment, there is only a displacement of the image along the x-axis. Accordingly, there is no bother-some rotation of the image.

In a further embodiment, provision is additionally or alternatively made for a second image capture unit, for example embodied as an image sensor based on semiconductors, to be arranged in the image plane of the second optical subsystem 13.

Figure 4:
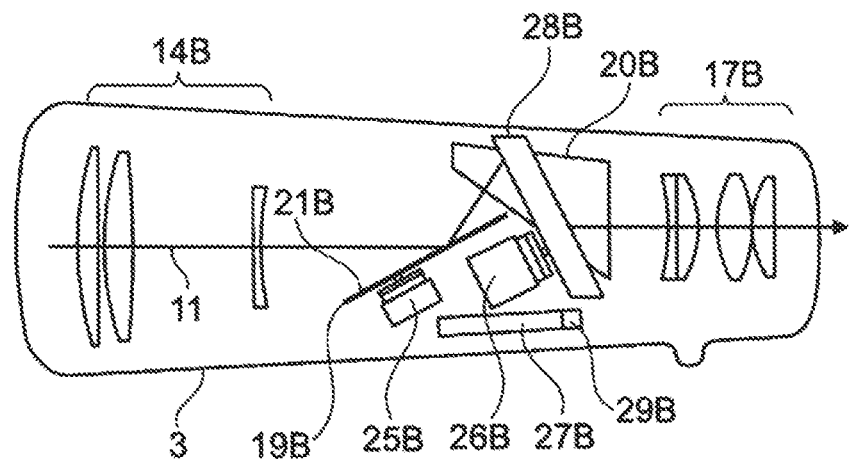
FIG. 4 shows a further schematic illustration of the second optical subsystem according to FIG. 3.

Drive units as illustrated in FIG. 4 are used in the disclosure to rotate the third optical unit 19B about the third axis of rotation 22B and to rotate the fourth optical unit 20B about the fourth axis of rotation 23B. FIG. 4 is based on FIG. 3. Identical components are provided with identical reference signs.

A second mirror drive unit 25B which provides power for rotating the third optical unit 19B about the third axis of rotation 22B is arranged in the second housing 3. Further, a second prism drive unit 26B which provides power for rotating the fourth optical unit 20B about the fourth axis of rotation 23B is arranged in the second housing 3. To this end, the second prism drive unit 26B interacts with a holder 28B of the fourth optical unit 20B. The second mirror drive unit 25B and/or the second prism drive unit 26B is/are embodied for example as a piezoceramic, as a piezo actuator, as a piezo bender actuator, as a piezo ultrasonic actuator, as a piezo traveling wave actuator, as a DC motor, as a stepper motor or as a voice coil motor. Explicit reference is made to the fact that the disclosure is not restricted to the use of the aforementioned drive units. Rather, any drive unit which is suitable for the disclosure can be used for the disclosure.

Deliberations have yielded that the embodiment of at least one of the aforementioned drive units as a drive unit based on piezo technology is particularly advantageous. In this respect, reference is made to the explanations further above.

Further, a second control and/or adjustment unit 27B which transmits control and/or adjustment signals to the second mirror drive unit 25B and the second prism drive unit 26B is arranged in the second housing 3. Further, a second motion detector 29B is arranged in the second housing 3. The second motion detector 29B serves to ascertain a movement of the optical system, for example a rotational and/or a translational trembling movement. By way of example, the second motion detector 29B is embodied as a rate sensor, as a gyroscope sensor or as a magnetometer. Explicit reference is made to the fact that the disclosure is not restricted to the use of the aforementioned motion detectors. Rather, any motion detector suitable for the disclosure can be used.

Figure 5:
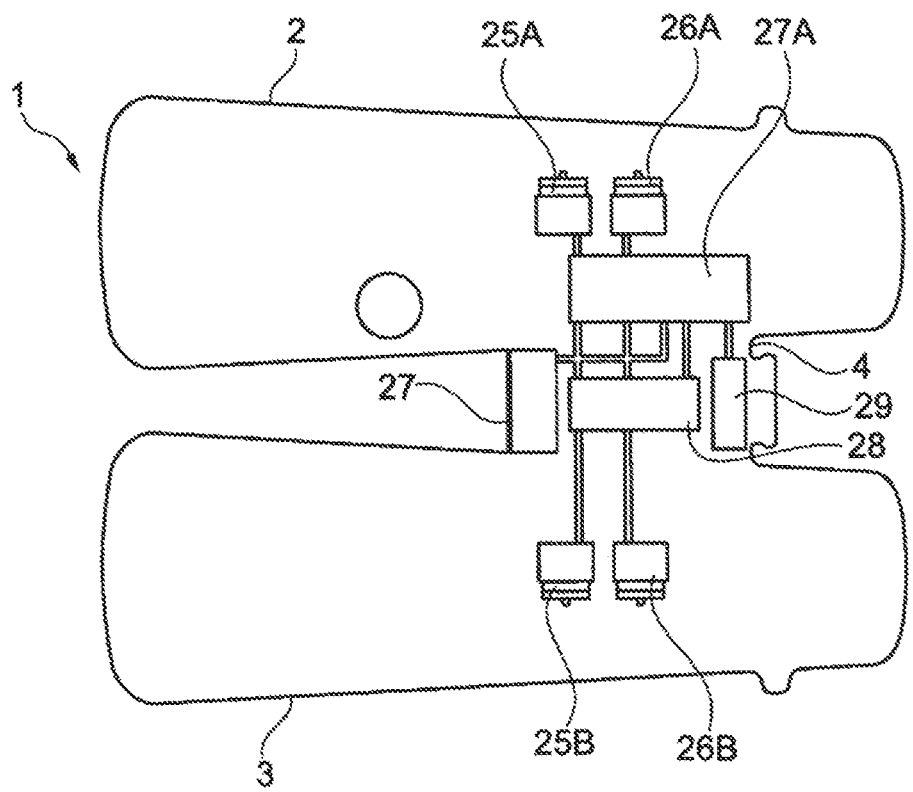
FIG. 5 shows a schematic illustration of a further optical system in the form of binoculars.

FIG. 5 shows a further embodiment of the binoculars 1. In this embodiment of the binoculars 1, the second mirror drive unit 25B and the second prism drive unit 26B are arranged in the second housing 3. Further, a first mirror drive unit 25A and a first prism drive unit 26A, which have the same functions and effects in the first optical subsystem 12 as the second mirror drive unit 25B and the second prism drive unit 26B have in the second optical subsystem 13, are arranged in the first housing 2. A motion detector 27 is arranged on the folding bridge 4. Further, a voltage supply unit 28 is arranged on the folding bridge 4. By way of example, the voltage supply unit 28 is embodied as a battery or rechargeable battery. Moreover, a folding bridge sensor 29 is arranged on the folding bridge 4. Further, a first control and/or adjustment unit 27A which is line-connected to the first mirror drive unit 25A, the first prism drive unit 26A, the second mirror drive unit 25B, the second prism drive unit 26B, the motion detector 27, the voltage supply unit 28 and the folding bridge sensor 29 is arranged in the first housing 2.

The folding bridge sensor 29 serves to identify a folding angle of the folding bridge 4. The first control and/or adjustment unit 27A is used to convert, on the basis of a coordinate transformation and/or further mathematical methods, control and/or adjustment signals from a first coordinate system, which were calculated for the first mirror drive unit 25A and for the first prism drive unit 26A on the basis of trembling movements and/or rotational movements detected by the motion detector 27, into control and/or adjustment signals in a second coordinate system for the second mirror drive unit 25B and for the second prism drive unit 26B.

Figure 6:
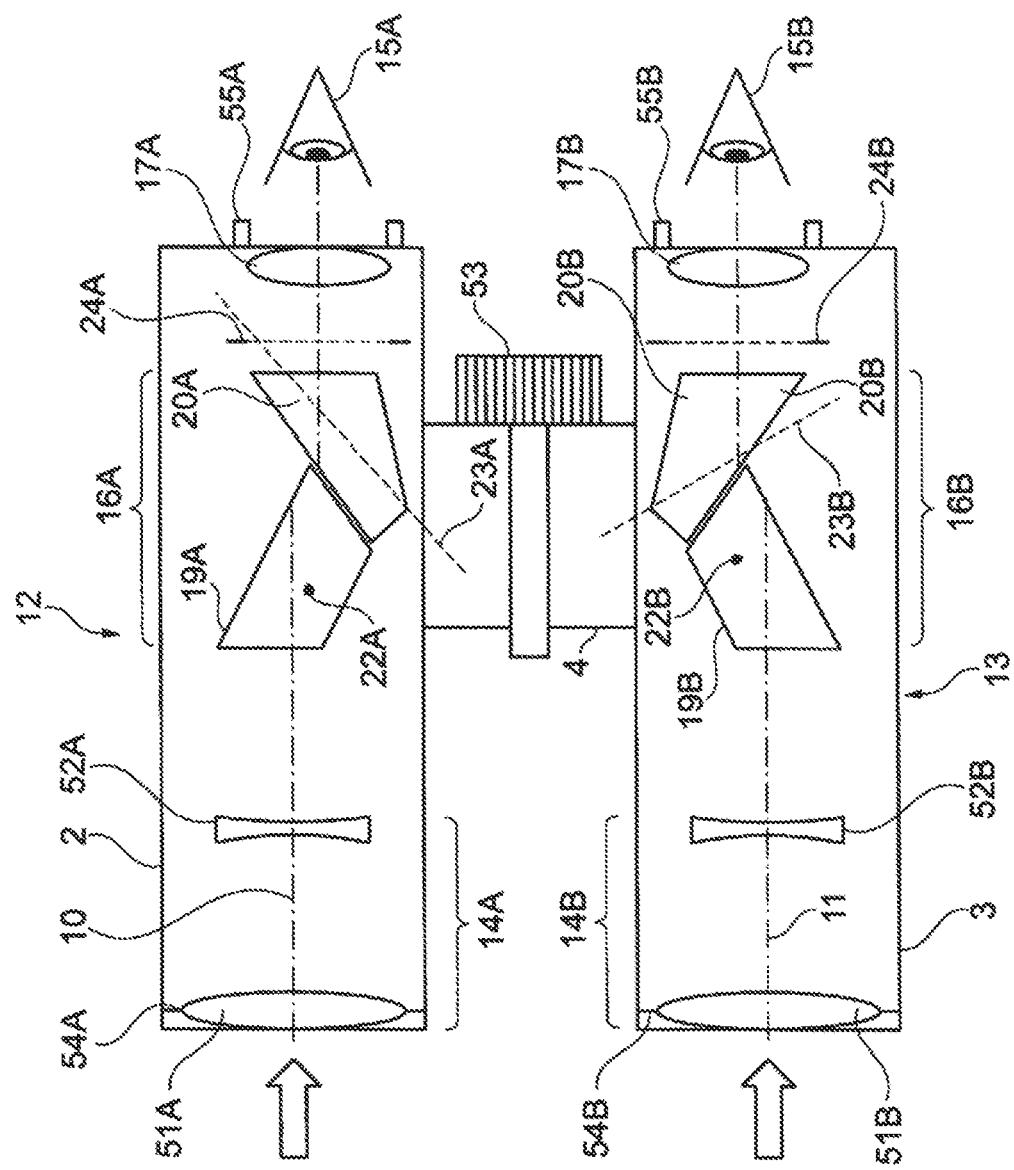
FIG. 6 shows a schematic illustration of yet a further optical system in the form of binoculars.
Figure 6:

FIG. 6 shows a further embodiment of the disclosure. The embodiment of FIG. 6 is based on the embodiment of FIG. 2. Identical components are provided with identical reference signs. Therefore, reference is made to the aforementioned explanations, which also apply in this case.

In the embodiment illustrated in FIG. 6, the first image stabilizing unit 16A is embodied as a prism erecting system. The first image stabilizing unit 16A comprises the first optical unit 19A and the second optical unit 20A. The first optical unit 19A is embodied as a first prism. The second optical unit 20A is embodied as a second prism. By way of example, the first image stabilizing unit 16A is embodied as an Abbe-König prism system, as a Schmidt-Pechan prism system or as a Porro prism system.

The first optical unit 19A of the first image stabilizing unit 16A as per FIG. 6 is embodied so as to be rotatable about a first axis of rotation 22A, the first axis of rotation 22A running at right angles into the plane of the drawing. The first axis of rotation 22A is the only axis of rotation about which the first optical unit 19A of the first image stabilizing unit 16A rotates. Accordingly, provision is made in this embodiment for the first optical unit 19A not to rotate about any further axis of rotation. The second optical unit 20A of the first image stabilizing unit 16A is embodied so as to be rotatable about a second axis of rotation 23A. In this embodiment, provision is made for the first axis of rotation 22A and the second axis of rotation 23A to be different axes. By way of example, the second axis of rotation 23A is aligned in relation to the first optical axis 10 as has already been explained further above.

The first optical unit 19A as per FIG. 6 can have at least one feature or a combination of at least two features as specified further above in respect of the first optical unit 19A as per FIG. 2. The second optical unit 20A as per FIG. 6 can have at least one feature or a combination of at least two features as specified further above in respect of the second optical unit 20A as per FIG. 2. By way of example, the first optical unit 19A and the second optical unit 20A as per FIG. 6 each have a reflecting side, at which light beams are deflected by total reflection of by way of a mirroring layer.

In the embodiment illustrated in FIG. 6, the second image stabilizing unit 16B is embodied as a prism erecting system. The second image stabilizing unit 16B comprises the third optical unit 19B and the fourth optical unit 20B. The third optical unit 19B is embodied as a third prism. The fourth optical unit 20B is embodied as a fourth prism. By way of example, the second image stabilizing unit 16B is embodied as an Abbe-König prism system, as a Schmidt-Pechan prism system or as a Porro prism system.

The third optical unit 19B of the second image stabilizing unit 16B as per FIG. 6 is embodied so as to be rotatable about a third axis of rotation 22B, the third axis of rotation 22B running at right angles into the plane of the drawing. The third axis of rotation 22B is the only axis of rotation about which the third optical unit 19B of the second image stabilizing unit 16B rotates. Accordingly, provision is made in this embodiment for the third optical unit 19B not to rotate about any further axis of rotation. The fourth optical unit 20B of the second image stabilizing unit 16B is embodied so as to be rotatable about a fourth axis of rotation 23B. In this embodiment, provision is made for the third axis of rotation 22B and the fourth axis of rotation 23B to be different axes.

The third optical unit 19B as per FIG. 6 can have at least one feature or combination of at least two features as specified further above in respect of the third optical unit 19B as per FIG. 2. The fourth optical unit 20B as per FIG. 6 can have at least one feature or combination of at least two features as specified further above in respect of the fourth optical unit 20B as per FIG. 2. By way of example, the third optical unit 19B and the fourth optical unit 20B as per FIG. 6 each have a reflecting side, at which light beams are deflected by total reflection of by way of a mirroring layer.

The embodiment of FIG. 6 can have the same drive units, motion detectors, control and/or adjustment units, the same folding bridge sensor and the same voltage supply units as were already explained in view of FIGS. 4 and 5. Accordingly, the explanations given above also applied to the embodiment of FIG. 6.

Figure 7:
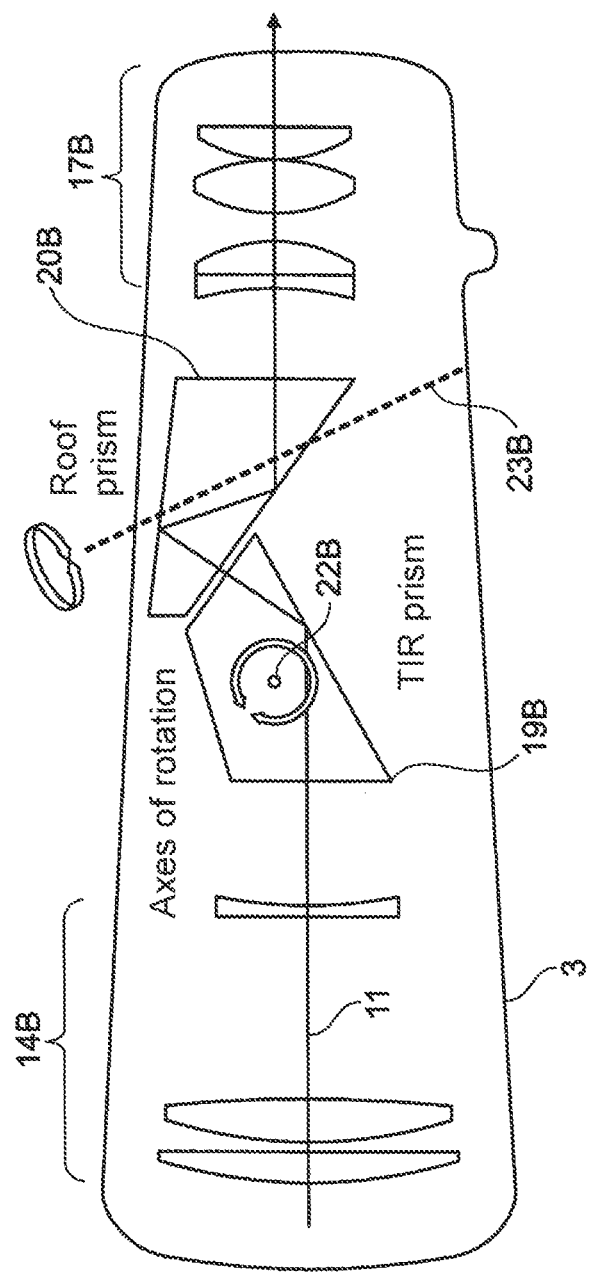
FIG. 7 shows a schematic illustration of a second optical subsystem of the binoculars according to FIG. 6.

FIG. 7 shows a schematic illustration of the second optical subsystem 13, which is arranged in the second housing 3. FIG. 7 is based on the illustration of the second optical subsystem 13 of FIG. 6. Identical components are provided with identical reference signs. In principle, the first optical subsystem 12 arranged in the first housing 2 has an identical design to the second optical subsystem 13. Consequently, the explanations below with respect to the second optical subsystem 13 are also applicable to the first optical subsystem 12. If the optical system according to the disclosure is embodied for example as a monocular, as a telescope or as a spotting scope, the optical system in principle has the same design as shown in FIG. 6. Accordingly, the explanations given below also apply to these optical systems.

As already mentioned above, the third optical unit 19B of the second image stabilizing unit 16B is embodied so as to be rotatable about a third axis of rotation 22B, the third axis of rotation 22B running at right angles into the plane of the drawing. The fourth optical unit 20B of the second image stabilizing unit 16B is embodied so as to be rotatable about the fourth axis of rotation 23B. In this embodiment, provision is made for the third axis of rotation 22B and the fourth axis of rotation 23B to be different axes.

A second system formed by the third optical unit 19B and a holder for the third optical unit 19B of the second image stabilizing unit 16B has a second center of gravity, the third axis of rotation 22B running through the second center of gravity. The second center of gravity is the center of mass of the second system. This is advantageous in that the third optical unit 19B of the second image stabilizing unit 16B is in principle mounted in equilibrium. Consequently, less torque than in the prior art is needed to rotate the third optical unit 19B of the second image stabilizing unit 16B, and so there are low mechanical requirements in respect of a drive unit for moving the third optical unit 19B and a lower power consumption in comparison with the prior art is obtained if an electrically operated drive unit is used.

Further, in the embodiment of the disclosure explained here, provision is made for the second optical axis 11 to intersect a reflecting surface of the third optical unit 19B at a second point of intersection, the third axis of rotation 22B running through the second point of intersection. A point of incidence of the second optical axis 11 is located just above the center of the reflecting surface. The reflecting surface of the third optical unit 19B of the second image stabilizing unit 16B can have a second center, the third axis of rotation 22B running through the second center. By way of example, the reflecting surface is a surface within the third optical unit 19B in the form of the first prism, at which incident light beams are deflected by total reflection. As an alternative thereto, the reflecting surface is a mirroring layer.

In one embodiment of the disclosure, provision is made for the third axis of rotation 22B, about which the third optical unit 19B rotates, to intersect a second plane. Further, provision is made in this embodiment for the fourth axis of rotation 23B, about which the fourth optical unit 20B rotates, to lie in the aforementioned second plane. By way of example, provision is made for the third axis of rotation 22B to be aligned along the x-axis of the above-described coordinate system. Then, the fourth axis of rotation 23B lies in the plane spanned by the y-axis and the z-axis. This is the yz-plane. By way of example, light beams are deflected in the second optical subsystem 13B in the case of a rotation of the third optical unit 19B about the third axis of rotation 22B in the form of the x-axis, in such a way that this brings about a displacement of the image in the image plane along the y-axis. This can counteract a displacement along the y-axis of the image generated by the second optical subsystem 13. Accordingly, there is a stabilization of the image along the y-axis. By rotating the fourth optical unit 20B about the fourth axis of rotation 23B, which lies in the aforementioned plane, light beams are deflected in the second optical subsystem 13, in such a way that this brings about a displacement of the image generated by the optical subsystem 13 in the image plane along the x-axis. Accordingly, there is a stabilization of the image along the x-axis.

In addition to the aforementioned intended displacement of the image along the x-axis, a rotation of the fourth optical unit 20B of the second image stabilizing unit 16B about any axis, for example any axis in the yz-plane, may also bring about an unwanted rotation of the image generated with the second optical subsystem 13. To avoid this unwanted rotation, one embodiment provides for the fourth axis of rotation 23B to be aligned perpendicular to the reflecting surface of the third optical unit 19B of the second image stabilizing unit 16B in the case of a non-stabilized state of the second optical subsystem 13. The non-stabilized state is present when there is no image stabilization. In this embodiment, there is only a displacement of the image along the x-axis. Accordingly, there is no bothersome rotation of the image.

Figure 8:
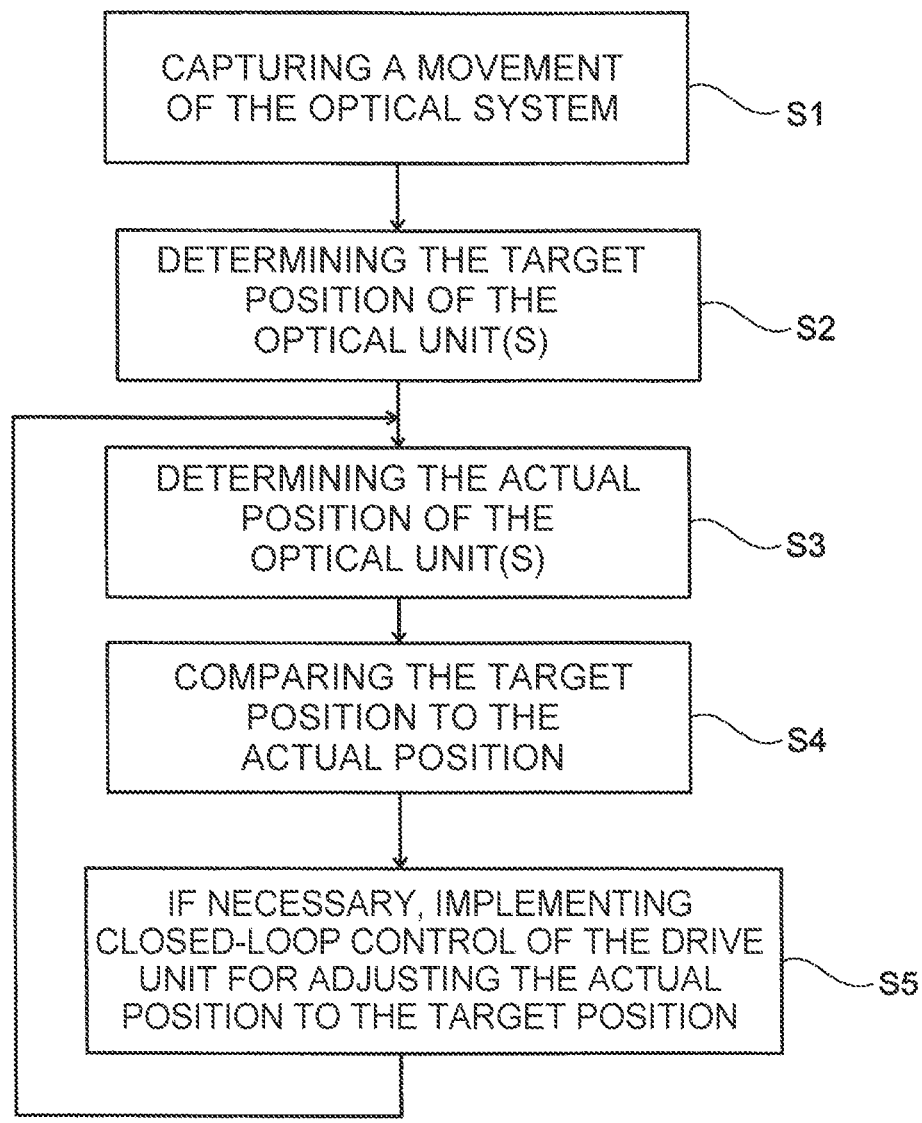
FIG. 8 shows a schematic illustration of a flowchart of an embodiment of the method according to the disclosure.

FIG. 8 illustrates a flowchart of an embodiment of the method according to the disclosure for operating the binoculars 1 as per FIG. 5. An image generated by the binoculars 1 is stabilized within the scope of the method. In a method step S1, a movement of the binoculars 1 is captured by the motion detector 27 and a movement signal is generated. In a method step S2, at least one of the following target positions of at least one of the following units is determined by a computing unit of the binoculars 1 on the basis of the movement signal: (i) a first target position of the first optical unit 19A of the first image stabilizing unit 16A, (ii) a second target position of the second optical unit 20A of the first image stabilizing unit 16A, (iii) a third target position of the third optical unit 19B of the second image stabilizing unit 16B, and (iv) a fourth target position of the fourth optical unit 20B of the second image stabilizing unit 16B. In particular, the target positions are determined on the basis of a specified strength of the stabilization and/or a specified use of the binoculars 1, for example in the case of a use in a moving means of transportation. In a method step S3, at least one of the following actual positions of at least one of the following units is determined with at least one first position sensor of the first mirror drive unit 25A, of the first prism drive unit 26A, of the second mirror drive unit 25B and of the second prism drive unit 26B: (i) a first actual position of the first optical unit 19A of the first image stabilizing unit 16A, (ii) a second actual position of the second optical unit 20A of the first image stabilizing unit 16A, (iii) a third actual position of the third optical unit 19B of the second image stabilizing unit 16B, and (iv) a fourth actual position of the fourth optical unit 20B of the second image stabilizing unit 16B. In a method step S4, the following positions are compared using the first control and/or adjustment unit 27A: (i) the first actual position of the first optical unit 19A of the first image stabilizing unit 16A with the first target position of the first optical unit 19A of the first image stabilizing unit 16A, (ii) the second actual position of the second optical unit 20A of the first image stabilizing unit 16A with the second target position of the second optical unit 20A of the first image stabilizing unit 16A, (iii) the third actual position of the third optical unit 19B of the second image stabilizing unit 16B with the third target position of the third optical unit 19B of the second image stabilizing unit 16B, and (iv) the fourth actual position of the fourth optical unit 20B of the second image stabilizing unit 16B with the fourth target position of the fourth optical unit (20B) of the second image stabilizing unit 16B. In method step S5, at least one step of the following steps is carried out:
  (i) if the first actual position of the first optical unit 19A of the first image stabilizing unit 16A differs from the first target position of the first optical unit 19A of the first image stabiliz-ing unit 16A, implementing adjustment of the first mirror drive unit 25A using the control and/or adjustment unit 27A, in such a way that the first optical unit 19A of the first image stabilizing unit 16A is adjusted to the first target position by way of a rotation about the first axis of rotation 22A;
  (ii) if the second actual position of the second optical unit 20A of the first image stabilizing unit 16A differs from the second target position of the second optical unit 20A of the first image stabilizing unit 16A, implement-ing adjustment of the first prism drive unit 26A using the first control and/or adjustment unit 27A, in such a way that the second optical unit 20A of the first image stabilizing unit 16A is adjusted to the second target position by way of a rotation about the second axis of rotation 23A;

(iii) if the third actual position of the third optical unit 19B of the second image stabilizing unit 16B differs from the third target position of the third optical unit 19B of the second image stabilizing unit 16B, implementing adjustment of the second mirror drive unit 25B using the first control and/or adjustment unit 27A, in such a way that the third optical unit 19B of the second image stabilizing unit 16B is adjusted to the third target position by way of a rotation about the third axis of rotation 22B;

(iv) if the fourth actual position of the fourth optical unit 20B of the second image stabilizing unit 16B differs from the fourth target position of the fourth optical unit 20B of the second image stabilizing unit 16B, implementing adjustment of the second prism drive unit 26B using the first control and/or adjustment unit 27A, in such a way that the fourth optical unit 20B of the second image stabilizing unit 16B is adjusted to the fourth target position by way of a rotation about the fourth axis of rotation 23B.

Following method step S5, method steps S3 to S5 are run through again until a respective target position is determined to correspond to, or to be sufficiently close to, the corresponding actual position in method step S4, i.e., for example, until the first actual position of the first optical unit 19A of the first image stabilizing unit 16A corresponds to, or is sufficiently close to, the first target position of the first optical unit 19A of the first image stabilizing unit 16A.

If a further movement of the binoculars 1 is subsequently captured, the method is run through again starting from method step S1.

The features of the disclosure disclosed in the present description, in the drawings and in the claims may be essential for the realization of the disclosure in the various embodiments thereof, both individually and in arbitrary combinations. The disclosure is not restricted to the described embodiments. It may be varied within the scope of the claims and taking into account the knowledge of the relevant person skilled in the art.

It is understood that the foregoing description is that of the exemplary embodiments of the disclosure and that various changes and modifications may be made thereto without departing from the spirit and scope of the disclosure as defined in the appended claims.

LIST OF REFERENCE NUMERALS

1 binoculars
2 First housing
3 Second housing
4 Folding bridge
5 First hinge part
6 Second hinge part
7 First holding part
8 Second holding part
9 Third holding part
10 First optical axis
11 Second optical axis
12 First optical subsystem
13 Second optical subsystem
14A First objective
14B Second objective
15A First eye
15B Second eye
16A First image stabilizing unit
16B Second image stabilizing unit
17A First eyepiece
17B Second eyepiece
19A First optical unit
19B Third optical unit
20A Second optical unit
20B Fourth optical unit
21A First mirror surface
21B Second mirror surface
22A First axis of rotation
22B Third axis of rotation
23A Second axis of rotation
23B Fourth axis of rotation
24A First intermediate image plane with field stop
24B Second intermediate image plane with field stop
25A First mirror drive unit
25B Second mirror drive unit
26A First prism drive unit
26B Second prism drive unit
27 Motion detector
27A First control and/or adjustment unit
27B Second control and/or adjustment unit
28 Voltage supply unit
28B Holder
29 Folding bridge sensor
29B Second motion detector
51A First front unit
51B Second front unit
52A First focusing unit
52B Second focusing unit
53 Rotary knob
54A First aperture stop
54B Second aperture stop
55A First eyecup
55B Second eyecup
74 Articulation axis
S1 to S5 Method steps
O Object

What is claimed is:

1. An optical system for imaging an object, the optical system comprising:
at least one first objective;
at least one first image stabilizing unit; and
at least one first image plane,
wherein:
as seen from the at least one first objective in a direction of the at least one first image plane along a first optical axis, the at least one first objective is arranged first, followed by the at least one first image stabilizing unit, and then by the at least one first image plane,
the at least one first image stabilizing unit includes at least one first optical unit and at least one second optical unit,
the at least one first optical unit of the at least one first image stabilizing unit is arranged rotatably such that the at least one first optical unit is rotatable only about a first axis of rotation,
the at least one second optical unit of the at least one first image stabilizing unit is arranged rotatably such that the at least one second optical unit is rotatable only about a second axis of rotation,
the first axis of rotation is different from the second axis of rotation,
the at least one second optical unit of the at least one first image stabilizing unit is a first optical roof edge unit,
the first optical roof edge unit is a first roof prism, and the at least one first image stabilizing unit is a first Abbe-König prism system.

2. The optical system as claimed in claim 1, wherein the optical system has one of the following features:
the at least one first optical unit of the at least one first image stabilizing unit is arranged between the at least one first objective and the at least one second optical unit of the at least one first image stabilizing unit, and
the at least one second optical unit of the at least one first image stabilizing unit is arranged between the at least one first objective and the at least one first optical unit of the at least one first image stabilizing unit.

3. The optical system as claimed in claim 1, wherein the at least one first optical unit of the at least one first image stabilizing unit comprises at least one first mirror, at least one first plane mirror and/or at least one first prism.

4. The optical system as claimed in claim 1, wherein the at least one first optical unit of the at least one first image stabilizing unit is embodied as a first plane mirror, and
wherein the first plane mirror has a first mirror surface.

5. The optical system as claimed in claim 1, wherein the optical system has at least one of the following features:
(i) at least one first system formed by the at least one first optical unit of the at least one first image stabilizing unit and a first holder for the at least one first optical unit has a first center of gravity, the first axis of rotation running through the first center of gravity, and
(ii) the first optical axis intersects a first mirror unit of the first optical unit of the first image stabilizing unit at a first point of intersection, the first axis of rotation running through the first point of intersection.

6. The optical system as claimed in claim 1, wherein:
the first axis of rotation intersects a first plane, and
the second axis of rotation is located in the first plane.

7. The optical system as claimed in claim 1, wherein, in a non-stabilized state of the optical system, the second axis of rotation is aligned at right angles to a surface of light incidence of the first optical unit.

8. The optical system as claimed in claim 1, wherein the optical system has one of the following features:
(i) a first image capture unit is arranged in the at least one first image plane,
(ii) a first image capture unit is arranged in the at least one first image plane, wherein the first image capture unit is embodied as an image sensor, and
(iii) the optical system comprises at least one first eyepiece, wherein, as seen from the at least one first objective in the direction of the at least one first image plane, the at least one first image plane is arranged first and then the first eyepiece.

9. The optical system as claimed in claim 1, wherein the optical system comprises a first housing, and
wherein the at least one first objective, the at least one first image stabilizing unit, and the at least one first image plane are arranged in the first housing.

10. The optical system as claimed in claim 9, wherein a first eyepiece is arranged in the first housing.

11. The optical system as claimed in claim 1, wherein the optical system has one of the following features:
(i) the at least one first image stabilizing unit is embodied as a first erecting system, and
(ii) the at least one first image stabilizing unit is embodied as a first prism erecting system.

12. The optical system as claimed in claim 1, wherein the optical system has one of the following features:
(i) at least one first drive unit for moving the at least one first optical unit and/or the at least one second optical unit of the first image stabilizing unit,
(ii) at least one first drive unit for moving the at least one first optical unit and/or the at least one second optical unit of the at least one first image stabilizing unit, wherein the first drive unit has at least one first piezoceramic,
(iii) at least one first drive unit for moving the at least one first optical unit and/or the at least one second optical unit of the at least one first image stabilizing unit, wherein the first drive unit has at least one first piezo actuator,
(iv) at least one first drive unit for moving the at least one first optical unit and/or the at least one second optical unit of the at least one first image stabilizing unit, wherein the first drive unit has at least one first motor, and
(v) at least one first drive unit for moving the at least one first optical unit and/or the at least one second optical unit of the at least one first image stabilizing unit and also at least one first control and/or adjustment unit for control and/or adjustment of the first drive unit.

13. The optical system as claimed in claim 1, wherein the optical system comprises at least one first motion detector for ascertaining a movement of the optical system.

14. The optical system as claimed in claim 1, wherein the optical system has the following feature:
(i) the at least one second optical unit of the at least one first image stabilizing unit is embodied as a first mirror system.

15. The optical system as claimed in claim 1, further comprising:
at least one second objective;
at least one second image stabilizing unit; and
at least one second image plane, wherein:
as seen from the at least one second objective in the direction of the at least one second image plane, the at least one second objective is arranged first along a second optical axis, followed by the at least one second image stabilizing unit, and then the at least one second image plane,
the at least one second image stabilizing unit comprises at least one third optical unit and at least one fourth optical unit,
the at least one third optical unit of the at least one second image stabilizing unit is arranged rotatably about a third axis of rotation,
the at least one fourth optical unit of the at least one second image stabilizing unit is arranged rotatably about a fourth axis of rotation,
the third axis of rotation is different from the fourth axis of rotation,
the at least one fourth optical unit of the at least one second image stabilizing unit is a second optical roof edge unit,
the second optical roof edge unit is a second roof prism, and
the at least one second image stabilizing unit is a second Abbe-König prism system.

16. The optical system as claimed in claim 15, wherein the optical system has one of the following features:
the at least one third optical unit of the at least one second image stabilizing unit is arranged between the at least one second objective and the at least one fourth optical unit of the at least one second image stabilizing unit, and the at least one fourth optical unit of the at least one second image stabilizing unit is arranged between the at least one second objective and the at least one third optical unit of the at least one second image stabilizing unit.

17. The optical system as claimed in claim 15, wherein the at least one third optical unit of the at least one second image stabilizing unit comprises at least one second mirror, at least one second plane mirror, and/or at least one second prism.

18. The optical system as claimed in claim 15, wherein the at least one third optical unit of the at least one second image stabilizing unit is embodied as a second plane mirror, and
wherein the second plane mirror has a second mirror surface.

19. The optical system as claimed in claim 15, wherein the optical system has at least one of the following features:
 (i) at least one second system formed by the at least one third optical unit of the at least one second image stabilizing unit and a second holder for the at least one third optical unit has a second center of gravity, the third axis of rotation running through the second center of gravity, and
 (ii) the second optical axis intersects a second surface of light incidence of the at least one third optical unit of the at least one second image stabilizing unit at a second point of intersection, the third axis of rotation running through the second point of intersection.

20. The optical system as claimed in claim 15, wherein:
the third axis of rotation intersects a second plane, and
the fourth axis of rotation is located in the second plane.

21. The optical system as claimed in claim 15, wherein the optical system has one of the following features:
 (i) a second image capture unit is arranged in the at least one second image plane,
 (ii) a second image capture unit which is embodied as an image sensor is arranged in the at least one second image plane, and
 (iii) the optical system comprises at least one second eyepiece, wherein, as seen from the at least one second objective in the direction of the at least one second image plane, the at least one second image plane is arranged first and then the second eyepiece.

22. The optical system as claimed in claim 15, further comprising:
a second housing, wherein the at least one second objective, the at least one second image stabilizing unit, and the at least one second image plane are arranged in the second housing.

23. The optical system as claimed in claim 22, wherein a second eyepiece is arranged in the second housing.

24. The optical system as claimed in claim 15, wherein the optical system has one of the following features:
 (i) the at least one second image stabilizing unit is embodied as a second erecting system, and
 (ii) the at least one second image stabilizing unit is embodied as a second prism erecting system.

25. The optical system as claimed in claim 15, wherein the optical system has one of the following features:
 (i) at least one second drive unit for moving the at least one third optical unit and/or the at least one fourth optical unit of the at least one second image stabilizing unit,
 (ii) at least one second drive unit for moving the at least one third optical unit and/or the at least one fourth optical unit of the at least one second image stabilizing unit, wherein the second drive unit has at least one second piezoceramic,
 (iii) at least one second drive unit for moving the at least one third optical unit and/or the at least one fourth optical unit of the at least one second image stabilizing unit, wherein the second drive unit has at least one second piezo actuator,
 (iv) at least one second drive unit for moving the at least one third optical unit and/or the at least one fourth optical unit of the at least one second image stabilizing unit, wherein the second drive unit has at least one second motor, and
 (v) at least one second drive unit for moving the at least one third optical unit and/or the at least one fourth optical unit of the at least one second image stabilizing unit and also at least one second control and/or adjustment unit.

26. The optical system as claimed in claim 15, wherein the optical system comprises at least one second motion detector for ascertaining a movement of the optical system.

27. The optical system as claimed in claim 15, wherein the optical system has the following feature:
 (i) the at least one fourth optical unit of the at least one second image stabilizing unit is embodied as a second mirror system.

28. The optical system as claimed in claim 9, further comprising a second housing,
wherein the optical system has at least one of the following features:
 (c) the first housing is embodied as a tube, and
 (ii) the second housing is embodied as a tube.

29. The optical system as claimed in claim 9, further comprising a second housing, wherein:
the first housing is connected to the second housing with at least one folding bridge,
the folding bridge comprises at least one first hinge part arranged on the first housing, and
the folding bridge comprises at least one second hinge part arranged on the second housing.

30. The optical system as claimed in claim 29, further comprising:
at least one sensor configured to identify a folding angle of the folding bridge.

31. The optical system as claimed in claim 1, wherein the optical system is embodied as a monocular, a spyglass, a pair of binoculars, a telescope, and/or a spotting scope.

32. A method for operating an optical system as claimed in claim 1, wherein image stabilization is implemented, the method comprising:
capturing a movement of the optical system with a first motion detector and/or a second motion detector and generating a movement signal;
determining at least one of the following target positions of at least one of the following units by a computing unit of the optical system based on the movement signal: (i) a first target position of the at least one first optical unit of the at least one first image stabilizing unit, (ii) a second target position of the at least one second optical unit of the at least one first image stabilizing unit, (iii) a third target position of the at least one third optical unit of at least one second image stabilizing unit, and (iv) a fourth target position of the at least one fourth optical unit of the at least one second image stabilizing unit;
determining at least one of the following actual positions of at least one of the following units with at least one first position sensor of a first drive unit and/or with at least one second position sensor of a second drive unit:
 (i) a first actual position of the at least one first optical unit of the at least one first image stabilizing unit, (ii) a second actual position of the at least one second optical unit of the at least one first image stabilizing unit, (iii) a third actual position of the at least one third optical unit of the at least one second image stabilizing unit, and (iv) a fourth actual position of the at least one fourth optical unit of the at least one second image stabilizing unit;

comparing the following positions using a first control and/or adjustment unit and/or the second control and/or adjustment unit: (i) the first actual position of the at least one first optical unit of the at least one first image stabilizing unit with the first target position of the at least one first optical unit of the at least one first image stabilizing unit, (ii) the second actual position of the at least one second optical unit of the at least one first image stabilizing unit with the second target position of the at least one second optical unit of the at least one first image stabilizing unit, (iii) the third actual position of the at least one third optical unit of the at least one second image stabilizing unit with the third target position of the at least one third optical unit of the at least one second image stabilizing unit, and (iv) the fourth actual position of the at least one fourth optical unit of the at least one second image stabilizing unit with the fourth target position of the at least one fourth optical unit of the at least one second image stabilizing unit;

carrying out at least one of the following steps:
  a) if the first actual position of the at least one first optical unit of the at least one first image stabilizing unit differs from the first target position of the at least one first optical unit of the at least one first image stabilizing unit, implementing control and/or adjustment of the first drive unit using the first control and/or adjustment unit and/or the second control and/or adjustment unit, such that the at least one first optical unit of the at least one first image stabilizing unit is moved iteratively into the first target position with a rotation about the first axis of rotation;
  b) if the second actual position of the at least one second optical unit of the at least one first image stabilizing unit differs from the second target position of the at least one second optical unit of the at least one first image stabilizing unit, implementing control and/or adjustment of the first drive unit with the first control and/or adjustment unit and/or the second control and/or adjustment unit, such that the at least one second optical unit of the at least one first image stabilizing unit is moved iteratively into the second target position by way of a rotation about the second axis of rotation;
  c) if the third actual position of the at least one third optical unit of the at least one second image stabilizing unit differs from the third target position of the at least one third optical unit of the at least one second image stabilizing unit, implementing control and/or adjustment of the second drive unit with the first control and/or adjustment unit and/or the second control and/or adjustment unit, such that the at least one third optical unit of the at least one second image stabilizing unit is moved iteratively into the third target position with a rotation about a third axis of rotation; and
  d) if the fourth actual position of the at least one fourth optical unit of the at least one second image stabilizing unit differs from the fourth target position of the at least one fourth optical unit of the at least one second image stabilizing unit, implementing control and/or adjustment of the second drive unit with the first control and/or adjustment unit and/or the second control and/or adjustment unit, such that the at least one fourth optical unit of the second image stabilizing unit is moved iteratively into the fourth target position by way of a rotation about a fourth axis of rotation.

* * * * *